United States Patent
Asami et al.

(10) Patent No.: US 6,927,242 B2
(45) Date of Patent: Aug. 9, 2005

(54) RESIN COMPOSITION, COATING MATERIALS CONTAINING THE SAME, COATING FILM AND PROCESS FOR FORMING THE FILM

(75) Inventors: Keiichi Asami, Sodegaura (JP); Tsukasa Murakami, Sodegaura (JP); Yugo Hasegawa, Sodegaura (JP)

(73) Assignee: Mitsui Chemicals, Inc., Tokyo (JP)

( * ) Notice: Subject to any disclaimer, the term of this patent is extended or adjusted under 35 U.S.C. 154(b) by 140 days.

(21) Appl. No.: 10/221,351

(22) PCT Filed: Jan. 15, 2002

(86) PCT No.: PCT/JP02/00187

§ 371 (c)(1),
(2), (4) Date: Sep. 12, 2002

(87) PCT Pub. No.: WO02/057357

PCT Pub. Date: Jul. 25, 2002

(65) Prior Publication Data

US 2003/0139515 A1 Jul. 24, 2003

(30) Foreign Application Priority Data

Jan. 17, 2001 (JP) ........................................ 2001-008618
Jan. 17, 2001 (JP) .......................................... 2001-08619

(51) Int. Cl.$^7$ ............................ C08F 2/50; C08L 23/26; C08L 25/04
(52) U.S. Cl. .......................... 522/79; 522/80; 522/149; 522/42; 522/150; 522/153; 522/157; 522/160; 522/161
(58) Field of Search .............................. 522/79, 80, 42, 522/149, 150, 153, 157, 158, 159, 160, 161, 120, 125, 111, 112, 109, 110

(56) References Cited

U.S. PATENT DOCUMENTS 4,299,754 A    11/1981  Shiomi et al.
4,323,636 A *   4/1982  Chen ........................ 430/271.1
4,980,269 A *  12/1990  Sakurai et al. ........... 430/283.1
5,250,389 A *  10/1993  Nakamura et al. ........ 430/281.1
5,384,341 A *   1/1995  Itagaki et al. ................ 522/111
5,434,213 A *   7/1995  Chen et al. .................. 524/533
6,051,652 A *   4/2000  Kawate et al. ............... 525/119
6,419,858 B1 *  7/2002  Houston et al. .............. 264/1.1
6,646,022 B2 * 11/2003  Okazaki et al. ............. 522/153

FOREIGN PATENT DOCUMENTS

JP          54-056692 A        5/1979
JP          55-048260 A        4/1980

* cited by examiner

*Primary Examiner*—Susan Berman
(74) *Attorney, Agent, or Firm*—Burns, Doane, Swecker & Mathis, LLP

(57) ABSTRACT

A resin composition of the present invention is obtainable by adding a photo-polymerization initiator (d) to a resin solution (a) containing a modified product of a thermoplastic resin (A). The modified product is prepared by conducting radical polymerization of the thermoplastic resin (A) with a (co)polymer (B) of a copolymerizable monomer (C) comprising a monomer having an α,β-mono-ethynically unsaturated group, or the monomer and other copolymerizable monomers in a weight ratio (A)1(B) of 1/9 to 9/1, in an organic solvent, or by conducting polymerization of a copolymerizable monomer (C) comprising a monomer having an α,β-mono-ethylenically unsaturated group, or the monomer and other copolymerizable monomers in a weight ratio (A)/(C) of 1/9 to 9/1, in an organic solvent in the presence of the thermoplastic resin (A), and then conducting radical polymerization thereof. A paint including the resin composition and a process for forming a coating film are also disclosed.

8 Claims, No Drawings

RESIN COMPOSITION, COATING MATERIALS CONTAINING THE SAME, COATING FILM AND PROCESS FOR FORMING THE FILM

FIELD OF THE INVENTION

The present invention relates to a resin composition, which comprises a resin solution containing a polyolefin or styrene thermoplastic elastomer, and a photo-polymerization initiator. More particularly, it relates to resin compositions useful for paints, primers or adhesives, etc, which are suitable for application on polyolefin resin films, sheets, foamed articles or molded articles etc.

BACKGROUND OF THE INVENTION

Polyolefin resins generally have many merits, for example, good productivity, excellent various molding properties, light weight, rust prevention and impact resistance so that they are widely used as materials for interior and exterior materials of cars, ships or the like, home electric appliances, household furniture, miscellaneous goods, construction materials etc. The polyolefin resins are non-polar and crystalline, unlike synthetic resins having a polarity, which are represented by polyurethane resins, polyamide resins, acrylic resins and polyester resins so that it is very difficult to apply on or bond to polyolefin resin molded articles by the use of common paints or adhesives.

On this account, in coating on or bonding to polyolefin resin molded articles, it has been conducted to improve adhesion to the surfaces of the articles by activating the surfaces.

For example, for car bumpers, the surface thereof has been subjected to etching treatment with halogen-containing organic solvents such as trichloroethane to enhance the adhesion between the surface and a coating film, or the surface has been subjected to pretreatment such as corona discharge treatment, plasma treatment or ozone treatment, and thereafter subjected to objective coating or bonding.

However, coating or bonding with conventionally known paints or adhesives not only takes large cost in the equipment but also requires a lot of time in the execution, and further results in uneven finish. This is the cause of inducing a difference in surface treated conditions.

In the above circumstances, as the paint compositions for improving the above problems, for example, JP-B-50-10916/1975 discloses a composition comprising modified chlorinated polyolefin as a main component, and JP-B-62-21027/1987 discloses a composition comprising a polyolefin modified with a maleic acid. These compositions, however, have insufficient adhesion strength to polyolefin resin molded articles so that they are usually only used to parts which do not need to have high adhesion strength.

Therefore, the advent of novel resin compositions and paint compositions capable of solving the conventional problems as described above has been desired.

The present inventors have earnestly studied for solving the above problems and found that the resin compositions prepared by mixing a resin solution containing a polyolefin or styrene thermoplastic elastomer with a photo-polymerization initiator are very useful. Thus, the present invention has been accomplished.

It is an object of the present invention to provide a novel resin composition capable of solving the conventional problems as described above.

Specifically, the resin composition of the present invention is prepared by mixing a resin solution containing a modified product of a thermoplastic resin (for example, a polyolefin or styrene thermoplastic elastomer) with a photo-polymerization initiator. The resin composition is applied on a substrate and irradiated with light, and then can be submitted to use as a primer, paint or adhesive.

The coating film of the resin composition according to the present invention has excellent adhesion to untreated polyolefin resin films or sheets, foamed or molded articles etc.

DISCLOSURE OF THE INVENTION

The resin composition of the present invention is a resin composition obtainable by mixing a resin solution (a) containing a modified product of a thermoplastic resin (A) with a photo-polymerization initiator (d).

The modified product is prepared by radical polymerization reaction, in an organic solvent, of the thermoplastic resin (A) and a (co)polymer (B) of a copolymerizable monomer (C) comprising a monomer having an $\alpha, \beta$-mono ethylenically unsaturated group, or the monomer and other copolymerizable monomers, in a weight ratio of (A) to (B) of from 1/9 to 9/1.

The other resin composition according to the present invention is a resin composition obtainable by mixing a resin solution (a) containing a modified product of the thermoplastic resin (A) with a photo-polymerization initiator (d).

The modified product is prepared by polymerization reaction, in an organic solvent, of a copolymerizable monomer (C) comprising a monomer having an $\alpha, \beta$-mono ethylenically unsaturated group, or the monomer and other copolymerizable monomers, in the presence of a thermoplastic resin (A) in a weight ratio of (A) to (C) of from 1/9 to 9/1 and then subjecting to radical polymerization.

The thermoplastic resin (A) is usually a polyolefin (A1) or a styrene thermoplastic elastomer (A2).

When the thermoplastic resin (A) is the polyolefin (A1), the modified product of the thermoplastic resin (A) is:

(1) a modified polyolefin (A1-2) prepared by radical polymerization reaction, in an organic solvent, of a polyolefin (A1-1) and a (co)polymer (B) of a copolymerizable monomer (C) comprising a monomer having an $\alpha, \beta$-mono ethylenically unsaturated group, or the monomer and other copolymerizable monomers, in a weight ratio of (A1-1) to (B) of from 1/9 to 9/1, or (2) a modified polyolefin (A1-3) prepared by polymerization reaction, in an organic solvent, of a copolymerizable monomer (C) comprising a monomer having an $\alpha, \beta$-mono ethylenically unsaturated group, or the monomer and other copolymerizable monomers, in the presence of the polyolefin (A1-1) in a weight ratio of (A1-1) to (C) of from 1/9 to 9/1 and then subjecting to radical polymerization.

When the thermoplastic resin (A) is a styrene thermoplastic elastomer (A2), the modified product of the thermoplastic resin (A) is:

(1) a modified styrene thermoplastic elastomer (A2-2) prepared by radical polymerization reaction, in an organic solvent, of the styrene thermoplastic elastomer (A2-1) and the (co)polymer (B) of the copolymerizable monomer (C) comprising a monomer having an $\alpha, \beta$-mono ethylenically unsaturated group, or the monomer and other copolymerizable monomers, in a weight ratio of (A2-1) to (B) of from 1/9 to 9/1, or (2) a modified styrene thermoplastic elastomer (A2-3) prepared by polymerization reaction, in an organic solvent, of the copolymerizable monomer (C) comprising a monomer having an α,β-mono ethylenically unsaturated group, or the monomer and other copolymerizable monomers, in the presence of the styrene thermoplastic elastomer (A2-1) in a weight ratio of (A2-1) to (C) of from 1/9 to 9/1 and then subjecting to radical polymerization.

Preferable examples of the (co)polymer (B) constituting the modified products of the thermoplastic resin (A) include a modified product which has a polymerizable unsaturated bond in the molecule of the (co)polymer (B) and a modified product obtainable by reacting a carboxylic anhydride having a polymerizable unsaturated bond with the (co)polymer (B) having a hydroxyl group in the molecule.

The resin compositions of the present invention may be added, as a third component, at least one selected from the group consisting of oils and fats, derivatives thereof, epoxy resins and polyester resins, according to necessity in an amount not detrimental to the object of the invention. One of the third components is preferably a component having a polymerizable unsaturated bond in the molecule.

The above polymerization reaction can be carried out in the presence of an organic peroxide.

Preferable examples of the organic peroxide are organic peroxides having a tert-butyl group and/or benzyl group.

The resin compositions of the present invention may be those prepared by removing an organic solvent contained in the above resin compositions and diluting the resin compositions with any organic solvents.

The process for forming the coating film according to the present invention comprises the steps of applying the resin compositions of the invention and then irradiating with light.

The coating film of the present invention is prepared with the process for forming the coating film according to the invention.

The paint of the present invention comprises the resin composition having active hydrogen and/or hydroxyl group according to the present invention and a curing agent capable of reacting with the active hydrogen and/or the hydroxyl group.

The other process for forming the coating film according to the present invention comprises the steps of applying the paint of the invention and then curing it by irradiation with light.

The other coating film of the present invention is prepared with the other process for forming the coating film according to the invention.

PREFERRED EMBODIMENTS OF THE INVENTION

The resin composition, the paint containing the composition, the coating film and the process for forming the coating film according to the present invention will be described in detail hereinafter.

The resin composition of the invention is prepared by mixing a specific resin solution (a) with a photo-polymerization initiator (d).

Resin Solution (a)

The resin solution (a) used in the invention comprises a modified product of a thermoplastic resin (A), specifically a modified product of a polyolefin (A1) or a modified product of a styrene thermoplastic elastomer (A2).

Modified Product of Polyolefin (A1)

The polyolefin (A1) used in preparing the modified product of the polyolefin (A1) according to the invention may be a polyolefin (A1-1) and/or a modified polyolefin prepared by modifying the polyolefin (A1-1).

Examples of the polyolefin (A1-1) may include homopolymers of ethylene, propylene, 1-butene, 1-heptene, 1-octene, 1-hexene, 1-decene, 4-methyl-1-pentene etc, and copolymers thereof. These homopolymers or copolymers may contain dienes such as butadiene as a co-monomer.

Particularly, in the case of preparing paints, primers and adhesives used for applying on materials made of polypropylene, it is preferred to use, as the polyolefin (A1), a propylene homopolymer or a propylene copolymer comprising 50% by mol or more of propylene.

Examples of the modified polyolefin may include:

(1) a modified polyolefin (A1-2) prepared by a process of radically reacting the polyolefin (A1-1) with the (co)polymer (B) of the copolymerizable monomer (C) comprising a monomer having an α,β-mono-ethylenically unsaturated group, or the monomer and other copolymerizable monomers, in the presence of an organic solvent, (2) a modified polyolefin (A1-3) modified by a process of polymerizing the copolymerizable monomer (C) comprising a monomer having an α,β-mono-ethylenically unsaturated group, or the monomer and other copolymerizable monomers, in the presence of the polyolefin (A1-1), and then conducting radical polymerization, and (3) a modified polyolefin (A1-4) prepared by modifying the polyolefin (A1-1) with an organic acid having an unsaturated bond, etc.

When the polyolefin (A1) has a smaller weight average molecular weight (hereinafter abbreviated to Mw), the resulting resin composition tends to have lower adhesion to a material to be coated. On the other hand, when it has a larger Mw, the resin solution (a) tends to have a higher viscosity. Usually the Mw is preferably in the range of 5,000 to 200,000.

The (co)polymer (B) used in preparing the modified polyolefin (A1-2) of the invention is composed of the copolymerizable monomer (C) which comprises a monomer having an α,β-mono-ethylenically unsaturated group, or the monomer and other copolymerizable monomers.

Examples of the monomer having an α,β-mono-ethylenically unsaturated group may include:

(meth)acrylic acid esters such as methyl(meth)acrylate, ethyl(meth)acrylate, propyl(meth)acrylate, n-butyl(meth)acrylate, isobutyl(meth)acrylate, tert-butyl(meth)acrylate, 2-ethylhexyl(meth)acrylate, stearyl(meth)acrylate, tridecyl(meth)acrylate, lauroyl(meth)acrylate, cyclohexyl(meth)acrylate, benzyl(meth)acrylate, phenyl(meth)acrylate, dimethylaminoethyl(meth)acrylate, diethylaminoethyl(meth)acrylate etc;

hydroxyl group-containing vinyl compounds such as hydroxyethyl acrylate, 2-hydroxyethyl(meth)acrylate etc;

carboxyl group-containing vinyl compounds such as acrylic acid, methacrylic acid, maleic acid, itaconic acid etc, and mono-esterified compounds thereof;

aromatic vinyl compounds such as styrene, α-methylstyrene, vinyl toluene, t-butyl styrene etc; and acrylonitrile, methacrylonitrile, vinyl acetate, vinyl propionate, acrylamide, methacrylamide, methylol acrylamide, methylol methacryl amide, ethylene, propylene and α-olefins of 4 to 20 carbon atoms.

The term "methyl(meth)acrylate" described herein shows methyl acrylate or methyl methacrylate.

Further, the other copolymerizable monomer constituting the (co)polymer (B) may include monomers copolymerizable with monomers having an α,β-mono-ethylenically unsaturated group, for example, carboxylic anhydrides such as maleic anhydride, phthalic anhydride or succinic anhydride.

The (co)polymer (B) comprises these monomers singly or in combination. For example, known acrylic resins can be used as the (co) polymer (B) of the invention.

Further, copolymers having a polymerizable unsaturated bond in the molecule prepared by modifying the (co) polymer (B) prepared using these monomers can be used as the (co)polymer (B).

The modified (co)polymer (B) is prepared by known processes, for example, a process of adding a carboxylic anhydride having a polymerizable unsaturated bond such as maleic anhydride, phthalic anhydride, succinic anhydride etc to the (co)polymer (B) which has a hydroxyl group in the molecule since it contains hydroxy group-containing vinyl compounds such as hydroxyethyl acrylate, 2-hydroxy ethyl (meth)acrylate as monomer constituent units, and a process of adding a resin or a monomer each having a polymerizable unsaturated bond and a hydroxyl group to one isocyanate group of a urethane resin having two isocyanate groups and further adding the hydroxyl group of the (co)polymer (B) to the other isocyanate group.

The hydroxyl group valence of the (co) polymer (B) having the hydroxyl groups in a solid state is preferably 1 to 200 KOHmg/g, more preferably 5 to 150 KOHmg/g.

The resin solution (a) containing the modified polyolefin (A1-2) used in the invention is obtainable by, for example, a process of radical reaction of the polyolefin (A1-1) with the (co)polymer (B) of the copolymerizable monomer (C) comprising a monomer having an α,β-mono-ethylenically unsaturated group, or the monomer and other copolymerizable monomers, in the presence of an organic solvent.

Further, the resin solution (a) containing the modified polyolefin (A1-3) used in the invention is obtainable by, for example, a process of polymerizing the copolymerizable monomer (C) comprising a monomer having an α,β-mono-ethylenically unsaturated group, or the monomer and other copolymerizable monomers, in the presence of the polyolefin (A1-1) and then conducting a radical polymerization.

The resin solution (a) containing the modified polyolefin (A1-4) used in the present invention can be prepared by the process as described in JP-B-62-21027/1987.

Further, the resin solution (a) containing the polyolefin (A1-1) used in the invention can be prepared by a process of dissolving the polyolefin (A1-1) in an organic solvent.

The resin solution (a) containing the modified polyolefin (A1-2) is preferably prepared by mixing the polyolefin (A1-1) and the (co)polymer (B) in a mass ratio of (A1-1) to (B) of from 1/9 to 9/1, preferably 2/8 to 8/2 in the organic solvent, and elevating the temperature thereof to 80 to 200° C. and thereafter allowing the mixture to react by radical formation (namely radical reaction).

Examples of the organic solvent may include:

aromatic hydrocarbons such as xylene, toluene, ethyl benzene etc;

aliphatic hydrocarbons such as hexane, heptane, octane, decane etc;

alicyclic hydrocarbons such as cyclohexane, cyclohexene, methylcyclohexane etc;

aliphatic alcohols such as ethanol, isopropyl alcohol etc;

ketone solvents such as methylethylketone, methylisobutylketone etc;

ester solvents such as butyl acetate, ethyl acetate, propylene glycol monomethylether acetate, ethylene glycol monoacetate etc; and ether solvents such as dipropylether, propylene glycol monomethylether, diethylene glycol dibutyl ether etc.

Further, the organic solvents used herein may be a mixture of two or more of the above solvents. Among them, it is preferred to use aromatic hydrocarbons, aliphatic hydrocarbons and alicyclic hydrocarbons. Among aliphatic hydrocarbons, it is particularly preferred to use aliphatic hydrocarbons having 6 to 20 carbon atoms, and alicyclic hydrocarbons The organic solvent is used in such an amount that the non-volatile component in the polyolefin (A1-1) dissolved in the organic solvent is in an amount of 2 to 70% by mass.

In carrying out the radical reaction, examples of a process for radical forming may include a process of irradiating light in the presence of a photo-polymerization initiator, a process of adding an organic peroxide and other known processes.

Examples of the photo-polymerization initiator may include benzoyl, benzoin methyl ether, benzoin isopropyl ether, benzyl, benzophenone, 2-hydroxy-2-methylpropiophenone, 2,2-diethoxy acetophenone, benzyl methylketal, anthraquinone, chloroanthraquinone, ethylanthraquinone, butylanthraquinone, diphenylsulfide, dithiocarbamate, 2-chlorothioxanthone, α-chloromethyl naphthalene, anthracene, 3,3',4,4'-tetrabenzophenone, 2,4,6-trimethylbenzoyl diphenyl phosphine oxide etc. These may be used singly or in combination with two or more.

The photo-polymerization initiator, further, may be used in combination with amines such as Michler's ketone, trimethylamine, alkyl morpholine etc.

The photo-polymerization initiator may be used in an amount of usually 0.01 to 10 parts by mass, preferably 0.1 to 5 parts by mass, based on the total amount (100 parts by mass) of the polyolefin (A1-1) and the (co)polymer (B).

Examples of the organic peroxide may include di-tert-butyl peroxide, tert-butyl peroxy-2-ethylhexanoate, benzoyl peroxide, dicumyl peroxide, tert-butyl peroxy benzoate, cumene hydroperoxide etc, which have a tert-butyl group and/or benzyl group in the molecule. These may be used singly or in combination with two or more.

Of the above organic peroxides, di-tert-butyl peroxide and tert-butyl peroxy-2-ethylhexanoate are more preferably used. That is, the organic peroxides having a tert-butyl group and/or benzyl group in the molecule have relatively high hydrogen abstraction ability and an effect of improving graft efficiency with polyolefins. The resulting resin compositions prepared by using these organic peroxides scarcely induce separation phenomenon.

The organic peroxides can be used in an amount of usually 2 to 50 parts by mass, more preferably 3 to 30 parts by mass based on the total amount (100 parts by mass) of the polyolefin (A1-1) and the (co)polymer (B). It is preferred to add the organic peroxides in limited amounts for hours as many as possible. That is, although the addition method is dependent on the amount of the organic peroxides used, it is preferred to add the organic peroxides in limited amounts for many hours continuously or many times.

In the preparation of the resin solution (a) containing the modified polyolefin (A1-3), the monomer having an α,β-mono-ethylenically unsaturated group or the monomer and other copolymerizable monomers, which constitute the above (co)polymer (B) can be used as the copolymerizable monomer (C).

Examples of the organic solvent used in this case may include the organic solvents used in the preparation of the resin solution containing the modified polyolefin (A1-2).

In the polymerization of the copolymerizable monomer (C) in the presence of the polyolefin (A1-1), examples of the polymerization initiators used may include:

organoperoxides such as di-tert-butyl peroxide, tert-butylperoxy-2-ethylhexanoate, benzoyl peroxide, dicumyl per oxide, lauroyl peroxide, tert-butyl peroxy benzoate, cumene hydroperoxide etc; and azo compounds such as azobisisobutylonitrile, 4,4'-azobis (4-cyanopentanoic acid), 2,2'-azobis(2-methyl-N-(2-hydroxyethyl)propioamide) etc. These may be used singly or in combination with two or more.

As an example of the process of polymerizing the copolymerizable monomer (C) comprising the monomer having an α,β-mono-ethylenically unsaturated group or the monomer and the other copolymerizable monomers in the presence of the polyolefin (A1-1), and then conducting radical reaction, the following process is exemplified. The process comprises the step of dissolving the polyolefin (A1-1) in the above organic solvent and polymerizing with feeding the copolymerizable monomer (C) and the above polymerization initiator in a mass ratio of the polyolefin (A1-1) to the copolymerizable monomer (C) of 1/9 to 9/1, preferably 2/8 to 8/2.

The resin mixture thus prepared is subjected to radical reaction in the organic solvent in the same manner as the reaction of the polyolefin (A1-1) with the (co)polymer (B), and thereby the resin solution (a) containing the modified polyolefin (A1-3) can be prepared. The resin compositions prepared by using the resin solution (a) containing the modified polyolefin (A1-3) with the present process have more excellent stability and a low viscosity as compared with the resin compositions prepared by using the resin solution (a) containing the modified polyolefin (A1-2) so that application with the resin composition having a high concentration can be performed.

As the modified polyolefin (A1-4), for example, modified polyolefin prepared by known processes as described in JP-B-62-21027/1987 can be used. Further, the organic solvent used in the preparation of the resin solution containing the modified polyolefin (A1-2) can be used as the organic solvent.

The organic solvent used in preparing the resin solution (a) by the process of dissolving the polyolefin (A1-1) in the organic solvent is also usable as the organic solvent used in preparing the resin solution containing the polyolefin (A1-2).

In the preparation of the resin solution (a) containing the polyolefin (A1) with the above processes, the resin solution (a) may be prepared by using a combination of the polyolefin (A1-1) with the modified polyolefins (A1-2, A1-3, A1-4).

[Modified Product of Styrene Thermoplastic Elastomer (A2)]

As the styrene thermoplastic elastomer (A2) used in preparing the modified product of the styrene thermoplastic elastomer (A2) according to the present invention, the styrene thermoplastic elastomer (A2-1) and/or the modified styrene thermoplastic elastomer prepared by modifying the styrene thermoplastic elastomer (A2-1) may be exemplified.

Examples of the styrene thermoplastic elastomer (A2-1) may include styrene thermoplastic elastomers such as styrene/butadiene block copolymer, styrene/isoprene block copolymer, styrene/ethylene/butylene block copolymer, styrene/ethylene/propylene block copolymer etc, and hydrogenated products thereof.

As the styrene thermoplastic elastomer (A2-l), those having a styrene content of 5 to 60% by mass, preferably 10 to 45% by mass are preferably used.

Particularly, in the case of preparing primers, paints and adhesives used for applying on materials made of thermoplastic elastomer, it is preferred to use styrene/ethylene/butylene block copolymer and styrene/ethylene/propylene block copolymer as the styrene thermoplastic elastomer (A2).

Examples of the modified styrene thermoplastic elastomer may include:

(1) a modified styrene thermoplastic elastomer (A2-2) modified by a process of radically reacting the styrene thermoplastic elastomer (A2-1) with the (co)polymer (B) of the copolymerizable monomer (C) comprising a monomer having an α,β-mono-ethylenically unsaturated group or the monomer and other copolymerizable monomers in the presence of an organic solvent, (2) a modified styrene thermoplastic elastomer (A2-3) modified by a process of polymerizing the copolymerizable monomer (C) comprising a monomer having an α,β-mono-ethylenically unsaturated group or the monomer and other copolymerizable monomers in the presence of the styrene thermoplastic elastomer (A2-1), and then subjecting to radical polymerization, and (3) a modified styrene thermoplastic elastomer (A2-4) prepared by modifying a styrene thermoplastic elastomer with an organic acid having an unsaturated bond.

When the styrene thermoplastic elastomer (A2) has a smaller weight average molecular weight (hereinafter abbreviated to Mw), the resulting resin composition tends to have lower adhesion to a material to be coated. On the other hand, when it has a larger Mw, the resin solution (a) tends to have a higher viscosity. Usually the Mw is preferably in the range of 5,000 to 200,000.

The (co)polymer (B) used in preparing the modified styrene thermoplastic elastomer (A2-2) of the invention comprises the copolymerizable monomer (C) comprising a monomer having an α,β-mono-ethylenically unsaturated group, or the monomer having an α,β-mono-ethylenically unsaturated group and other copolymerizable monomers.

The (co)polymer (B), the monomer having an α,β-mono-ethylenically unsaturated group, other copolymerizable monomers and the copolymerizable monomer (C) are the same as those used in preparation of the modified polyolefin described in the paragraph of the polyolefin (A1).

The resin solution (a) containing the modified styrene thermoplastic elastomer (A2-2) used in the invention is prepared by, for example, a process of radically reacting the styrene thermoplastic elastomer (A2-1) with the (co) polymer (B) of the copolymerizable monomer (C) comprising a monomer having an α,β-mono-ethylenically unsaturated group or the monomer and other copolymerizable monomers in the presence of the organic solvent.

The resin solution (a) containing the modified styrene thermoplastic elastomer (A2-3) used in the invention can be prepared by a process of polymerizing the copolymerizable monomer (C) comprising a monomer having an α,β-mono-ethylenically unsaturated group or the monomer and other copolymerizable monomers in the presence of the styrene thermoplastic elastomer (A2-1), and then subjecting to radical polymerization.

The resin solution (a) containing the modified styrene thermoplastic elastomer (A2-4) used in the invention can be prepared by, for example, the process described in JP-A-Hei4-264174/1992.

Further, the resin solution (a) containing the styrene thermoplastic elastomer (A2-1) used in the invention can be prepared by a process of dissolving the styrene thermoplastic elastomer (A2-1) in an organic solvent.

The resin solution (a) containing the modified styrene thermoplastic elastomer (A2-2) is preferably prepared by mixing the styrene thermoplastic elastomer (A2-1) and the (co)polymer (B) in a mass ratio of (A2-1) to (B) of from 1/9 to 9/1, preferably 2/8 to 8/2, in the organic solvent, and elevating the temperature thereof to 80 to 200° C. and thereafter subjecting the mixture to reaction by radical formation (namely radical reaction).

Examples of the organic solvent may include:

aromatic hydrocarbons such as xylene, toluene, ethyl benzene etc;

aliphatic hydrocarbons such as hexane, heptane, octane, decane etc;

alicyclic hydrocarbons such as cyclohexane, cyclohexene, methylcyclohexane etc;

aliphatic alcohols such as ethanol, isopropyl alcohol etc;

ketone solvents such as methylethyl ketone, methylisobutyl ketone etc;

ester solvents such as butyl acetate, ethyl acetate, propylene glycol monomethylether acetate, ethylene glycol monoacetate etc; and ether solvents such as dipropylether, propylene glycol monomethylether, diethylene glycol dibutyl ether etc.

Further, the organic solvents used herein may be a mixture of two or more of the above solvents. Among them, it is preferred to use aromatic hydrocarbons, aliphatic hydrocarbons and alicyclic hydrocarbons. Among aliphatic hydrocarbons, it is particularly preferred to use aliphatic hydrocarbons having 6 to 20 carbon atoms, and alicyclic hydrocarbons.

The organic solvent is used in such an amount that the non-volatile component contained in the styrene thermoplastic elastomer (A2-1) dissolved in the organic solvent is in an amount of 2 to 70% by mass.

In carrying out the radical reaction, examples of a process for radical forming may include a process of irradiating light in the presence of a photo-polymerization initiator, a process of adding an organic peroxide and other known processes.

Examples of the photo-polymerization initiator may include the same as those described in the paragraph of the polyolefin (A1). The photo-polymerization initiator may be used singly or in combination with two or more.

The photo-polymerization initiator, further, may be used in combination with amines such as Michler's ketone, trimethylamine, alkyl morpholine etc.

The photo-polymerization initiator may be used in an amount of usually 0.01 to 10 parts by mass, preferably 0.1 to 5 parts by mass, based on the total amount (100 parts by mass) of the styrene thermoplastic elastomer (A2-1) and the (co)polymer (B).

Examples of the organic peroxide may include di-tert-butyl peroxide, tert-butyl peroxy-2-ethylhexanoate, benzoyl peroxide, dicumyl peroxide, tert-butyl peroxy benzoate, cumene hydroperoxide etc, which have a tert-butyl group and/or benzyl group in the molecule. These may be used singly or in combination with two or more.

Of the above organic peroxides, di-tert-butyl peroxide and tert-butyl peroxy-2-ethylhexanoate are more preferably used. That is, the organic peroxides having a tert-butyl group and/or benzyl group in the molecule have relatively high hydrogen abstraction ability and an effect of improving a graft efficiency with the styrene thermoplastic elastomer. Using these organic peroxides, the resulting resin compositions scarecely induce separation phenomenon.

The organic peroxides can be used in an amount of usually 2 to 50 parts by mass, more preferably 3 to 30 parts by mass based on the total amount (100 parts by weight) of the styrene thermoplastic elastomer (A2-1) and the (co) polymer (B) It is preferred to add the organic peroxides in limited amounts for hours as many as possible. That is, although the addition method is dependent on the amount of the organic peroxides used, it is preferred to add the organic peroxides in limited amounts for many hours continuously or many times.

In the preparation of the resin solution (a) containing the modified styrene thermoplastic elastomer (A2-3), the monomer having an $\alpha,\beta$-mono-ethylenically unsaturated group or the monomer and other copolymerizable monomers, which constitute the above (co)polymer (B) can be used as the copolymerizable monomer (C).

Examples of the organic solvent used in this case may include the organic solvents used in the preparation of the resin solution containing the modified styrene thermoplastic elastomer (A2-2).

In the polymerization of the copolymerizable monomer (C) in the presence of the styrene thermoplastic elastomer (A2-1), the polymerization initiators used are the same compounds as those used in the polymerization of the copolymerizable monomer (C) in the presence of the above-mentioned polyolefin (A1-1). The polymerization initiators may be used singly or in combination with two or more.

As an example of the process of polymerizing the copolymerizable monomer (C) comprising the monomer having an $\alpha,\beta$-mono-ethylenically unsaturated group or the monomer and the other copolymerizable monomers in the presence of the styrene thermoplastic elastomer (A2-1), and then subjecting to radical reaction, the following process is exemplified. The process comprises the step of dissolving the styrene thermoplastic elastomer (A2-1) in the above organic solvent and polymerizing with feeding the copolymerizable monomer (C) and the above polymerization initiator in a mass ratio of the styrene thermoplastic elastomer (A2-1) to the copolymerizable monomer (C) of 1/9 to 9/1, preferably 2/8 to 8/2.

The resin mixture thus prepared is subjected to radical reaction in the organic solvent in the same manner as the reaction of the styrene thermoplastic elastomer (A2-1) with the (co)polymer (B) and thereby the resin solution (a) containing the modified styrene thermoplastic elastomer (A2-3) can be prepared. The resin compositions prepared using the resin solution (a) containing the modified styrene thermoplastic elastomer (A2-3) with the present process have more excellent stability and a lower viscosity as compared with resin compositions prepared by using the resin solution (a) containing the modified styrene thermoplastic elastomer (A2-2) so that application with the resin compositions having a high concentration can be performed.

As the modified styrene thermoplastic elastomer (A2-4), prepared by known processes, for example, the process as described in JP-A-Hei4-264174/1992 can be used.

Further, the organic solvent used in the preparation of the resin solution (a) by the process of dissolving the styrene thermoplastic elastomer (A2-1) in the organic solvent can be also used as the organic solvent used in the preparation of the resin solution containing the modified styrene thermoplastic elastomer (A2-2).

In the preparation of the resin solution (a) containing the styrene thermoplastic elastomer (A2) with the above processes, the resin solution (a) may be prepared by using the styrene thermoplastic elastomer (A2-1) and the modified styrene thermoplastic elastomers (A2-2, A2-3 and A2-4) in combination with each other.

Photo-polymerization Initiator (d)

As the photo-polymerization initiator (d) used in the present invention, any photo-polymerization initiators capable of generating radicals by irradiation with ultraviolet ray can be used. Examples thereof may include benzoin, benzoin methyl ether, benzoin isopropyl ether, benzyl, benzophenone, 2-hydroxy-2-methylpropiophenone, 2,2-diethoxy acetophenone, benzyl dimethylketal, anthraquinone, chloroanthraquinone, ethylanthraquinone, butylanthraquinone, diphenylsulfide, dithiocarbamate, 2-chlorothioxanthone, α-chloromethyl naphthalene anthracene, 3,3,4,4-tetrabenzophenone, 2,4,6-trimethylbenzoyl diphenyl phosphine oxide etc. These may be used singly or in combination with two or more.

The photo-polymerization initiator, further, may be used in combination with amines such as Michler's ketone, trimethylamine, alkyl morpholine etc.

Of the above photo-polymerization initiators, the initiators having a benzyl group in the molecule, on the ground of relatively high hydrogen abstraction ability and effect of improving the adhesion with a substrate, such as benzophenone, 3,3,4,4-tetrabenzophenone etc are more preferably used.

When the photo-polymerization initiator is used in a smaller amount, the resulting composition tends to have lowered adhesion strength with a substrate, on the other hand, when in a larger amount, it tends to easily have scission of molecules and thereby have lowered adhesion strength with a substrate. The photo-polymerization may be used in an amount of usually 0.01 to 10 parts by mass, preferably 0.1 to 5 parts by mass, based on 100 parts by mass of the resin components.

Process for Preparing Resin Composition

The resin compositions of the present invention can be prepared by mixing the above-mentioned resin solution (a) and the photo-polymerization initiator (d) with stirring by known methods.

In the process for preparing the resin compositions according to the invention, a third component may be added to the resin compositions.

For example, in the process of polymerizing the copolymerizable monomer (C) in the presence of the polyolefin (A1-1) or the styrene thermoplastic elastomer (A2-1) and/or the process of radical reaction, at least one selected from fats and oils, derivatives thereof, epoxy resins and polyester resins may be added as the third component in the range not detrimental to the object of the invention.

Examples of the fats and oils used as the third component may include linseed oil, soy bean oil, castor oil and their purified products.

Examples of the derivatives of the fats and oils used as the third component may include short oil alkyd, middle oil alkyd and long oil alkyd resins prepared by modifying with fats and oils (aliphatic acid) the resins having a skeleton of polyacids such as phthalic anhydride, etc and polyvalent alcohols such as glycerin, pentaerythritol, ethylene glycol etc, and resins prepared by modifying the above alkyd resins with a natural resin, synthetic resin, or a polymerizable monomer, such as rosin-modified alkyd resin, phenol-modified alkyd resin, epoxy-modified alkyd resin, acrylated alkyd resin, urethane-modified alkyd resin etc.

Further, it is possible to use fats and oils having a polymerizable unsaturated bond prepared by adding a carboxylic anhydride having a polymerizable unsaturated bond in the molecule to fats and oils having a hydroxyl group. The above fats and oils and derivatives thereof may be used in combination with two or more.

Examples of the epoxy resins used as the third component may include epoxy resins prepared by glycidyl etherifying bisphenol A, bisphenol F, novolak etc, and glycidyl etherified epoxy resins prepared by adding propylene oxide or ethylene oxide to bisphenol A. Further, amine-modified epoxy resins prepared by adding polyfunctional amine to an epoxy group may be used. Furthermore, aliphatic epoxy resins, alicyclic epoxy resins, polyether epoxy resins etc may be exemplified.

Further, it is possible to use epoxy resins having a polymerizable unsaturated bond in the molecule prepared by adding a carboxylic anhydride having a polymerizable unsaturated bond in the molecule to the above epoxy resins having a hydroxyl group. The above epoxy resins may be used in combination with two or more.

The polyester resins used as the third component are prepared by condensation polymerization of a carboxylic acid component and alcohol component. Examples of the carboxylic acid component are polyvalent carboxylic acids such as terephthalic acid, isophthalic acid, phtalic anhydride, naphthalene dicarboxylic acid, succinic acid, glutaric acid, adipic acid, azelaic acid, 1,10-decane dicarboxylic acid, cyclohexane dicarboxylic acid, trimellitic acid, maleic acid, fumaric acid etc and their lower alcohol esters; hydroxycarboxylic acids such as para-oxy benzoic acid, etc; and monovalent carboxylic acid such as benzoic acid, etc. These may be used in combination with two or more.

Examples of the alcohol component may include ethylene glycohol, diethylene glycohol, 1,3-propane diol, 1,3-butane diol, 1,4-butane diol, 1,5-pentane diol, 1,6-hexane diol, 1,10-decane diol, 3-methyl-pentane diol, 2,2'-diethyl-1,3-propane diol, 2-ethyl-1,3-hexane diol, neopentyl glycohol, trimethylol ethane, trimethylol propane, glycerin, pentaerythritol, ethylene oxide adducts of bisphenol A, propylene oxide adducts of bisphenol A, ethylene oxide adducts of hydrogenated bisphenol A, propylene oxide adducts of hydrogenated bisphenol A etc. These may be used in combination with two or more.

It is further possible to use polyester resins having a polymerizable unsaturated bond in the molecule prepared by adding a carboxylic anhydride having a polymerizable unsaturated bond in the molecule to the above polyester resins having a hydroxyl group. The above polyester resins may be used singly or in combination with two or more.

The addition of the third component may be conducted by feeding it to a reactor or by introducing into a reactor in the first place. The third component is used in an amount of usually 0.5 to 60 parts by mass, preferably 5 to 40 parts by mass based on 100 parts by mass of the resin component. The third component may be added after the radical reaction process.

Particularly, the resin compositions prepared using the fats and oils, and their derivatives as the third component have excellent stability and good compatibility with other resins so that peel strength thereof is extremely increased. Especially, the resin composition containing castor oil has high effect.

The organic solvent in the resin composition thus prepared can be replaced with any organic solvent by known processes.

The organic solvents used in preparation of the resin solution containing the modified polyolefin (A1-2) and the modified styrene thermoplastic elastomer (A2-2) can be used as the organic solvent for replacement.

The resin composition thus prepared according to the invention can be used for paints, primers, or adhesives.

Among the resin compositions of the invention, the resin compositions containing, as constitutional units, hydroxyethyl acrylate, 2-hydroxyethyl(meth)acrylate, acrylic acid, methacrylic acid etc and having active hydrogen and/or hydroxyl group can be used in combination with a curing agent capable of reacting with active hydrogen and/or hydroxyl group as a paint.

For example, mixing with a curing agent having an isocyanate group in the molecule, which agent is one of the curing agents capable of reacting with active hydrogen and/or hydroxyl group, the resin compositions can be used as paints, primers and adhesives having a urethane bond.

The curing agents having an isocyanate group in the molecule and capable of reacting with active hydrogen and/or hydroxyl group may include polyisocyanate compounds, for example:

aromatic diisocyanates such as phenylene diisocyanate, tolylene diisocyanate, xylene diisocyanate, diphenyl methane diisocyanate etc;

aliphatic diisocyanates such as hexamethylene diisocyanate, trimethylhexamethylene diisocyanate, lysine diisocyanate etc; and alicyclic diisocyanates such as isophorone diisocyanate, dicyclohexylmethane diisocyanate etc.

Further, it is possible to use, as the curing agent, isocyanate-terminated adducts obtainable by reacting at least one or two or more of these polyisocyanate compounds with polyether polyols or polyester polyols prepared by adding polypropylene oxide and/or ethylene oxide etc to polyvalent alcohols such as trimethylolpropane, triethanol amine etc and an initiator such as trimethylol propane, etc.

Furthermore, it is possible to use amino resins prepared from melamine, urea etc as the curing agent.

The resin composition according to the present invention and the curing agent capable of reacting with active hydrogen and/or hydroxyl groups can be used in any proportion.

In the case that the curing agent capable of reacting with active hydrogen and/or hydroxyl groups has an isocyanate group, the blend ratio, in terms of equivalent weight, of active hydrogen contained in the resin composition to an isocyanate group contained in the curing agent is preferably from 0.5:1.0 to 1.0:0.5, more preferably 0.8:1.0 to 1.0:0.8.

In the case that the curing agent capable of reacting with active hydrogen and/or hydroxyl groups is an amino resin, the blend ratio, in terms of mass, of the resin composition to the solid amino resin is preferably from 95:5 to 20:80, more preferably 90:10 to 60:40.

The resin composition of the present invention may be blended with monofunctional (meth)acrylate and urethane (meth)acrylate by known methods and then submitted to use.

Examples of the monofuntional (meth)acrylate may include 2-ethylhexyl(meth)acrylate, dodecyl(meth)acrylate, phenoxy(meth) acrylate, cyclohexyl(meth)acrylate, isobonyl(meth)acrylate, dicyclopentenyl(meth)acrylate, dicyclopentenyloxyethyl(meth)acrylate etc. These may be used singly or in combination with two or more.

The above urethane (meth)acrylate is an urethane (meth) acrylate selected from aromatic, aliphatic and cycloaliphatic urethane (meth) acrylates and also is a ploymerizable urethane (meth)acrylate which comprises at least one isocyanate group and at least one polymerizable (meth)acryl group. The urethane (meth)acrylate, further, may be a polyurethane (meth)acrylate selected from aromatic, aliphatic and cycloaliphatic polyurethane (meth) acrylates. These may be used singly or in combination with two or more. These urethane (meth)acrylates and polyurethane (meth)acrylates are reaction products of an isocyanate-terminated group and a hydroxyl group-containing (meth)acrylate. These reaction products can be prepared by known methods.

The resin compositions of the invention thus prepared can be used as paints, primers, adhesives etc, and further may contain, according to necessity, various stabilizers and additives such as antioxidant, weathering agent, heat resistance agent etc within the limit of not detrimental to the object of the invention.

The methods of applying the resin compositions of the present invention or the blend of the resin compositions according to the invention with the curing agents capable of reacting with active hydrogen and/or hydroxyl group on the surfaces of films, sheets, foamed or molded articles are not particularly limited, preferably, it is suitable to apply by spray coating. For example, the application can be conducted by spraying the resin compositions on the surfaces of films, sheets, foamed or molded articles using a spray gun. Usually, the application can be easily conducted at room temperature and it is preferred to irradiate with ultraviolet light after the application.

The method of irradiating the coating film with ultraviolet light is not particularly limited. The coating film is irradiated with ultraviolet light in such an extent that the coated products are not deformed nor discolored.

The films have a thickness after drying of preferably from 0.1 to 50 $\mu$m, more preferably 0.5 to 30 $\mu$m.

The drying method thereof is not particularly limited. The drying can be conducted by appropriate methods such as natural drying, forced drying with heat etc.

The resin compositions or the paints prepared by mixing the resin compositions according to the present invention and the curing agents capable of reacting with active hydrogen and/or hydroxyl groups are applicable to a wide variety of uses as a primer in addition to the above uses as the paints because of having their properties. For example, on the surfaces of the coated products after drying, other paints may be applied with electrostatic deposition, spray coating, coating with brush etc.

The other paints used are not limited specially and examples thereof may include solvent type thermoplastic acrylic resin paints, solvent type thermosetting acrylic resin paints, acryl modified alkyd resin paints, epoxy resin paints, polyurethane resin paints, melamine resin paints etc.

The paints prepared by the resin compositions or prepared by mixing the resin compositions according to the present invention and the curing agents capable of reacting with active hydrogen and/or hydroxyl group are applicable to, as a top coating, films, sheets, foamed or molded articles made of polyolefins such as polyethylene, polypropylene etc, olefin copolymers such as ethylene/propylene copolymer, ethylene/butene copolymer, propylene/butene copolymer, ethylene/propylene/butene copolymer etc, and films, sheets, foamed or molded articles made of polypropylene and synthetic rubbers. Further, they can be applicable to surface treatment for polyamide resins, unsaturated polyester resins, polycarbonate resins etc.

The paints prepared by the resin compositions or prepared by mixing the resin compositions according to the present invention and the curing agents capable of reacting with active hydrogen and/or hydroxyl group are also useful as a primer of paints or adhesives etc which essentially comprises polyurethane resins, polyester resins, melamine resins or epoxy resins etc. The application thereof can improve adhesion of the paints etc to the surfaces of various articles to be coated and also can form coating films having more excellent sharpness, etc.

In particular, the paints prepared by the resin compositions or prepared by mixing the resin compositions according to the present invention and the curing agents capable of reacting with active hydrogen and/or hydroxyl groups are suitably used as a top coating for films, sheets, foamed or molded articles made of polyolefins such as polypropylene, etc, films, sheets, foamed or molded articles made of polypropylene and synthetic rubbers, and molded articles made of unsaturated polyesters, epoxy resins, polyurethane resins etc.

Furthermore, the paints prepared by the resin compositions or prepared by mixing the resin compositions according to the present invention and the curing agents capable of reacting with active hydrogen and/or hydroxyl group are suitable used as a primer of improving the adhesion of the paints to the surfaces of these films, sheets, foamed or molded articles.

EXAMPLES

The present invention will be described with reference to the examples, which are not intended to limit the scope of the present invention. In the followings, part and % are based on mass unless otherwise specified.

Preparation Examples A1 to A27
[Preparation of (Co)Polymer (B)]

In each example, to a four neck flask equipped with a stirrer, thermometer, reflux condenser and nitrogen-feeding tube, a solvent as described in the synthesis of a (co)polymer (B) in Tables A1-1 and A1-2 was charged and heated to 100° C. while purging with nitrogen.

Subsequently, into the flask, a mixed solution of a copolymerizable monomer (C) and a polymerization initiator as described in the synthesis of the (co)polymer (B) in Tables A1-1 and A1-2 was fed over 4 hr and then after 1 hr from the completion of the feeding, 0.4 part of t-butylperoxy-2-ethylhexanoate (hereinafter referred to as PBO) was added and allowed to react for 2 hr. Thereafter, a diluting solvent as described in the synthesis of the (co)polymer (B) in the above tables was added and diluted until the content of non-volatile components was 50%, to prepare the (co)polymer (B).

Preparation Examples A28 to A54
[Preparation of Carboxylic Anhydride-added (Co)Polymer (B)]

In each example, to a four neck flask equipped with a stirrer, thermometer, reflux condenser and nitrogen-feeding tube, a solvent as described in the synthesis of a (co)polymer (B) in Tables A1-3 and A1-4 was charged and heated to 100° C. while purging with nitrogen.

Subsequently, into the flask, a mixed solution of a copolymerizable monomer (C) and a polymerization initiator as described in the synthesis of the (co)polymer (B) in Tables A1-3 and A1-4 was fed over 4 hr and then after 1 hr from the completion of the feeding, 0.4 part of PBO was added and allowed to stand for 2 hr. Thereafter, the reaction mixture was diluted to have a non-volatile content of 50% by adding a diluting solvent as described in the synthesis of the (co)polymer (B) in the above tables. Thereafter, the temperature was raised to 100° C., a carboxylic anhydride as described in the addition of carboxylic anhydride in Tables A1-3 to A1-4 was added and allowed to react for 1 hr to prepare a carboxylic anhydride-added (co)polymer (B).

Preparation Examples A1 to A54
[Preparation of Modified Polyolefin (A1-2)-Containing Resin Solution (a)]

In each example, to the solution of the (co)polymer (B) or the solution of the carboxylic anhydride-added (co)polymer (B), a polyolefin (A1-1) and a solvent as described in the reaction of Tables A1-1 to A1-4, and further in Preparation Examples A14 to A27, and A41 to A54, a third component described in Table A1-4 were added and then heated to 135° C. while purging with nitrogen. In the case that the solvent is toluene, they were heated to 105° C.

Subsequently, di-tert-butylperoxide (hereinafter abbreviated to as PBD) which was an organic peroxide in such an amount as described in the reaction of Tables A1-1 and A1-4 was fed therein. The PBD addition was conducted separately in total three times in such a manner that at first, three sevenths of the amount described in Tables A1-1 and A1-4 was added and then after 1 hr, two sevenths of the amount was added, and further after 1 hr, the residual two sevenths of the amount was added, and thereby the reaction was conducted. After completion of the PBD addition, the reaction was conducted for 2 hr. Thereafter, a diluting solvent as described in the reaction of the above tables was added and diluted until the content of non-volatile components was 30%, to prepare a resin solution (a) containing a modified polyolefin (A1-2).

Preparation Examples A55 to A63 and A65 to A81
[Preparation of Resin Solution (a) Containing Modified Polyolefin (A1-3)]

In each example, to a four neck flask equipped with a stirrer, thermometer, reflux condenser and nitrogen-feeding tube, a polyolefin (A1-1) and a solvent as described in Tables A1-5 and A1-6 were charged and heated to 130° C. while purging with nitrogen.

To the flask, a mixed solution comprising a copolymerizable monomer (C) and a polymerization initiator as described in Tables A1-5 to A1-6, and in Preparation Examples A68 to A81, further comprising a third component described in Tables A1-5 and A1-6, was fed over 4 hr. After 30 min from the completion of the feeding, the mixture was heated to 135° C. and then after 30 min, a diluting solvent 1 as described in Tables A1-5 and A1-6 was added in such an amount as described together with PBD in the described amount as a polymerization initiator. After 30 min from the addition of the polymerization initiator, the mixture was heated to 160° C. Further, after 30 min, into the flask, PBD which was an organic peroxide was fed in such an amount as described in the reaction of Tables A1-5 and A1-6. The PBD addition was conducted separately in total three times in such a manner that at first, three sevenths of the amount described in the tables was added and then after 1 hr, two sevenths of the amount was added, and further after 1 hr the residual two sevenths of the amount was added, and thereby the reaction was conducted. After completion of the PBD addition, the mixture was allowed to stand for 2 hr and thereby reacted. Thereafter, a diluting solvent 2 as described in Tables A1-5 and A1-6 was added and diluted until the content of non-volatile components was 40%, to prepare a resin solution (a) containing a modified polyolefin (A1-3).

Preparation Example A64
[Preparation of Resin Solution (a) Containing Modified Polyolefin (A1-3)]

In this example, to a four neck flask equipped with a stirrer, thermometer, reflux condenser and nitrogen-feeding tube, a polyolefin (A1-1) and a solvent as described in Tables A1-5 were charged and heated to 100° C. while purging with nitrogen. Therein, a mixed solution which comprises a copolymerizable monomer (C) and azobisisobutylonitrile as a polymerization initiator (hereinafter abbreviated to as AIBN) as described in Tables A1-5 was fed over 4 hr. After 90 min from the completion of the feeding, a diluting solvent 1 as described in Table A1-5 was added in the described amount together with adding 0.75 part of AIBN. After 30 min from the AIBN addition, the mixture was heated to 160° C. Further, after 30min, into the mixture, PBD which was an organic peroxide in such an amount as described in Tables A1-5 was fed. The PBD addition was conducted separately in total three times in such a manner that at first, three sevenths of the amount described in Table was added and then after 1 hr, two sevenths of the amount was added, and further after 1 hr the residual two sevenths of the amount was added, and thereby the reaction was conducted. After completion of the PBD addition, the mixture was allowed to stand for 2 hr and thereby reacted. Thereafter, a diluting solvent 2 as described in Table A1-5 was added and diluted until the content of non-volatile components was 40%, to prepare a resin solution (a) containing a modified polyolefin (A1-3).

TABLE A1-1

| | Preparation Example A | | | | | | | | | | | |
|---|---|---|---|---|---|---|---|---|---|---|---|---|
| | 1–4 | 5 | 6 | 7 | 8 | 9 | 10 | 11 | 12 | 13 | 14 | 15 |
| Synthesis of (co)polymer (B) | | | | | | | | | | | | |
| Solvent | | | | | | | | | | | | |
| Xylene | 80 | 80 | 80 | 80 | | 80 | 80 | 80 | 80 | 80 | 80 | 80 |
| Toluene | | | | | 80 | | | | | | | |
| Copolymerizable monomer (C) | | | | | | | | | | | | |
| Styrene | 10 | 10 | 10 | 10 | 10 | 10 | 66.6 | | | | 15 | 15 |
| Methyl methacrylate | 66.6 | 66.6 | 66.6 | 66.6 | 66.6 | 59.8 | 10 | 55.6 | 55.6 | 55.6 | | |
| Ethyl acrylate | 16 | 16 | 16 | 16 | 16 | 16 | 16 | | | | | |
| Butyl acrylate | | | | | | | | | | | 20 | 20 |
| Butyl methacrylate | | | | | | | | | | | 59 | 59 |
| Isobutyl methacrylate | | | | | | | | 30 | 30 | 30 | | |
| Hydroxyethyl methacrylate | 7 | 7 | 7 | 7 | 7 | 14 | 7 | 14 | 14 | 14 | 5 | 5 |
| Acrylic acid | | | | | | 0.4 | | | | | | |
| Methacrylic acid | 0.4 | 0.4 | 0.4 | 0.4 | 0.4 | | 0.4 | 0.4 | 0.4 | 0.4 | 1 | 1 |
| Polymerization initiator (PBO) | 1.5 | 1.5 | 1.5 | 1.5 | 1.5 | 1.5 | 1.5 | 1.5 | 1.5 | 1.5 | 1.5 | 1.5 |
| Diluting solvent | | | | | | | | | | | | |
| Xylene | 20 | 20 | 20 | 20 | | 20 | 20 | 20 | 20 | 20 | 20 | 20 |
| Toluene | | | | | 20 | | | | | | | |
| Reaction | | | | | | | | | | | | |
| Polyolefin (A1-1) | 100 | 43 | 233 | 100 | 100 | 100 | 100 | 100 | 43 | 233 | 100 | 100 |
| Fats and Oils | | | | | | | | | | | | |
| OLESTER C1000 | | | | | | | | | | | 20 | |
| OLESTER F77-60MS | | | | | | | | | | | | 33.3 |
| Solvent Xylene | 100 | 43 | 233 | 100 | 100 | 100 | 100 | 100 | 43 | 233 | 100 | 86.7 |
| Organic peroxide (PBD) | 14 | 10 | 23.3 | 23.3 | 14 | 23.3 | 14 | 14 | 10 | 23.3 | 14 | 14 |
| Diluting solvent | | | | | | | | | | | | |
| Xylene | 267 | 191 | 444 | 267 | | 267 | 267 | 267 | 191 | 444 | 313 | 313 |
| Toluene | | | | | 267 | | | | | | | |

(Unit: part by weight)

TABLE A1-2

| | Preparation Example A | | | | | | | | | | | |
|---|---|---|---|---|---|---|---|---|---|---|---|---|
| | 16 | 17 | 18 | 19 | 20 | 21 | 22 | 23 | 24 | 25 | 26 | 27 |
| Synthesis of (co)polymer (B) | | | | | | | | | | | | |
| Solvent | | | | | | | | | | | | |
| Xylene | 80 | 80 | 80 | 80 | 80 | 80 | 80 | 80 | 80 | 80 | 80 | 80 |
| Copolymerizable monomer (C) | | | | | | | | | | | | |
| Styrene | 15 | 15 | 15 | 15 | 15 | 15 | 15 | 15 | 15 | 15 | 15 | 15 |
| Butyl acrylate | 20 | 20 | 20 | 20 | 20 | 20 | 20 | 20 | 20 | 20 | 20 | 20 |
| Butyl methacrylate | 59 | 59 | 59 | 59 | 59 | 59 | 59 | 59 | 59 | 59 | 59 | 59 |
| Hydroxyethyl methacrylate | 5 | 5 | 5 | 5 | 5 | 5 | 5 | 5 | 5 | 5 | 5 | 5 |

TABLE A1-2-continued

| | Preparation Example A | | | | | | | | | | | |
|---|---|---|---|---|---|---|---|---|---|---|---|---|
| | 16 | 17 | 18 | 19 | 20 | 21 | 22 | 23 | 24 | 25 | 26 | 27 |
| Methacrylic acid | 1 | 1 | 1 | 1 | 1 | 1 | 1 | 1 | 1 | 1 | 1 | 1 |
| Polymerization initiator (PBO) | 1.5 | 1.5 | 1.5 | 1.5 | 1.5 | 1.5 | 1.5 | 1.5 | 1.5 | 1.5 | 1.5 | 1.5 |
| Diluting solvent | | | | | | | | | | | | |
| Xylene | 20 | 20 | 20 | 20 | 20 | 20 | 20 | 20 | 20 | 20 | 20 | 20 |
| | | | | | Reaction | | | | | | | |
| Polyolefin (A1-1) | 100 | 100 | 100 | 100 | 100 | 100 | 100 | 100 | 100 | 100 | 100 | 100 |
| Fats and Oils | | | | | | | | | | | | |
| OLESTER C1000 | | | | 20 | 20 | | | | | 15 | 15 | 15 |
| OLESTER C1000 modified resin | | | | | | | 20 | | | 5 | | |
| Epoxy resin | | | | | | | | | | | | |
| EPOMIK R 140 | 20 | | | 10 | | | | | | | | |
| DENACOL EX941 | | 20 | | | | | | | | | | |
| EPOMIK R140 modified resin | | | | | | | | | 20 | | 5 | |
| Polyester resin | | | | | | | | | | | | |
| ALMATEX P646 | | | 33.3 | | | | | | | | | |
| OLESTER Q173 | | | | 20 | | 10 | | | | | | |
| ALMATEX P646 modified resin | | | | | | | | | | 33.3 | | 8.3 |
| Solvent Xylene | 100 | 100 | 86.7 | 100 | 100 | 100 | 100 | 100 | 86.7 | 100 | 100 | 96.7 |
| Organic peroxide (PBD) | 14 | 14 | 14 | 14 | 14 | 14 | 14 | 14 | 14 | 14 | 14 | 14 |
| Diluting solvent | | | | | | | | | | | | |
| Xylene | 313 | 313 | 313 | 313 | 313 | 313 | 313 | 313 | 313 | 313 | 313 | 313 |

(Unit: part by weight)

TABLE A1-3

| | Preparation Example A | | | | | | | | | | |
|---|---|---|---|---|---|---|---|---|---|---|---|
| | 28–31 | 32 | 33 | 34 | 35 | 36 | 37 | 38 | 39 | 40 | 41 |
| | | | | Synthesis of (co)polymer (B) | | | | | | | |
| Solvent | | | | | | | | | | | |
| Xylene | 80 | 80 | 80 | 80 | 80 | | 80 | 80 | 80 | 80 | 80 |
| Toluene | | | | | | 80 | | | | | |
| | | | | Copolymerizable monomer (C) | | | | | | | |
| Styrene | 10 | 10 | 10 | 10 | | 10 | 66.6 | 10 | 10 | 10 | 15 |
| Methyl methacrylate | 66.6 | 66.6 | 66.6 | 59.6 | 45.6 | 66.6 | 10 | 66.6 | 59.6 | 59.6 | |
| Ethyl acrylate | 16 | 16 | 16 | 16 | | 16 | 16 | 16 | 16 | 16 | |
| Butyl acrylate | | | | | | | | | | | 20 |
| Butyl methacrylate | | | | | | | | | | | 59 |
| Isobutyl methacrylate | | | | | 40 | | | | | | |
| Hydroxyethyl methacrylate | 7 | 7 | 7 | 14 | 14 | 7 | 7 | 7 | 14 | 14 | 5 |
| Acrylic acid | | | | 0.4 | | | | | | | |
| Methacrylic acid | 0.4 | 0.4 | 0.4 | | 0.4 | 0.4 | 0.4 | 0.4 | 0.4 | 0.4 | 1 |
| Polymerization initiator (PBO) | 1.5 | 1.5 | 1.5 | 1.5 | 1.5 | 1.5 | 1.5 | 1.5 | 1.5 | 1.5 | 1.5 |
| Diluting solvent | | | | | | | | | | | |
| Xylene | 20 | 20 | 20 | 20 | 20 | | 20 | 20 | 20 | 20 | 20 |
| Toluene | | | | | | 20 | | | | | |
| Addition of Carboxylic anhydride | | | | | | | | | | | |
| Maleic anhydride | 2 | 2 | 2 | 2 | 2 | 2 | 2 | | 6 | | 2 |
| Dodecenyl succinic anhydride | | | | | | | | 6 | | 15 | |

TABLE A1-3-continued

| | Preparation Example A | | | | | | | | | | |
|---|---|---|---|---|---|---|---|---|---|---|---|
| | 28–31 | 32 | 33 | 34 | 35 | 36 | 37 | 38 | 39 | 40 | 41 |
| | Reaction | | | | | | | | | | |
| Polyolefin (A1-1) | 100 | 43 | 233 | 100 | 100 | 100 | 100 | 100 | 100 | 100 | 100 |
| Fats and Oils | | | | | | | | | | | |
| OLESTER C1000 | | | | | | | | | | | 20 |
| Solvent | | | | | | | | | | | |
| Xylene | 100 | 43 | 233 | 100 | 100 | | 100 | 100 | 100 | 100 | 100 |
| Toluene | | | | | | 100 | | | | | |
| Organic peroxide (PBD) | 14 | 10 | 23.3 | 14 | 14 | 14 | 14 | 14 | 14 | 14 | 14 |
| Diluting solvent | | | | | | | | | | | |
| Xylene | 271 | 195 | 449 | 271 | 271 | | 271 | 281 | 281 | 302 | 318 |
| Toluene | | | | | | 271 | | | | | |

(Unit: part by weight)

TABLE A1-4

| | Preparation Example A | | | | | | | | | | | | |
|---|---|---|---|---|---|---|---|---|---|---|---|---|---|
| | 42 | 43 | 44 | 45 | 46 | 47 | 48 | 49 | 50 | 51 | 52 | 53 | 54 |
| | Synthesis of (co)polymer (B) | | | | | | | | | | | | |
| Solvent | | | | | | | | | | | | | |
| Xylene | 80 | 80 | 80 | 80 | 80 | 80 | 80 | 80 | 80 | 80 | 80 | 80 | 80 |
| | Copolymerizable monomer (C) | | | | | | | | | | | | |
| Styrene | 15 | 15 | 15 | 15 | 15 | 15 | 15 | 15 | 15 | 15 | 15 | 15 | 15 |
| Butyl acrylate | 20 | 20 | 20 | 20 | 20 | 20 | 20 | 20 | 20 | 20 | 20 | 20 | 20 |
| Butyl methacrylate | 59 | 59 | 59 | 59 | 59 | 59 | 59 | 59 | 59 | 59 | 59 | 59 | 59 |
| Hydroxyethyl methacrylate | 5 | 5 | 5 | 5 | 5 | 5 | 5 | 5 | 5 | 5 | 5 | 5 | 5 |
| Methacrylic acid | 1 | 1 | 1 | 1 | 1 | 1 | 1 | 1 | 1 | 1 | 1 | 1 | 1 |
| Polymerization initiator (PBO) | 1.5 | 1.5 | 1.5 | 1.5 | 1.5 | 1.5 | 1.5 | 1.5 | 1.5 | 1.5 | 1.5 | 1.5 | 1.5 |
| Diluting solvent | | | | | | | | | | | | | |
| Xylene | 20 | 20 | 20 | 20 | 20 | 20 | 20 | 20 | 20 | 20 | 20 | 20 | 20 |
| Addition of Carboxylic anhydride | | | | | | | | | | | | | |
| Maleic anhydride | 2 | 2 | 2 | 2 | 2 | 2 | 2 | 2 | 2 | 2 | 2 | 2 | 2 |
| | Reaction | | | | | | | | | | | | |
| Polyolefin (A1-1) | 100 | 100 | 100 | 100 | 100 | 100 | 100 | 100 | 100 | 100 | 100 | 100 | 100 |
| Fats and Oils | | | | | | | | | | | | | |
| OLESTER C1000 | | | | | | 20 | 20 | | | | 15 | 15 | 15 |
| OLESTER F77-60MS | 33.3 | | | | | | | | | | | | |
| OLESTER C1000 modified resin | | | | | | | | 20 | | | 5 | | |
| Epoxy resin | | | | | | | | | | | | | |
| EPOMIK R 140 | | 20 | | | | 10 | | | | | | | |
| DENACOL EX941 | | | 20 | | | | | | | | | | |
| EPOMIK R140 modified resin | | | | | | | | | | 20 | | 5 | |
| Polyester resin | | | | | | | | | | | | | |
| ALMATEX P646 | | | 33.3 | | | | | | | | | | |
| OLESTER Q173 | | | | 20 | | | 10 | | | | | | |
| ALMATEX P646 modified resin | | | | | | | | | | | 33.3 | | 8.3 |
| Solvent Xylene | 86.7 | 100 | 100 | 86.7 | 100 | 100 | 100 | 100 | 100 | 86.7 | 100 | 100 | 96.7 |
| Organic peroxide (PBD) | 14 | 14 | 14 | 14 | 14 | 14 | 14 | 14 | 14 | 14 | 14 | 14 | 14 |
| Diluting solvent | | | | | | | | | | | | | |
| Xylene | 318 | 318 | 318 | 318 | 318 | 341 | 341 | 318 | 318 | 318 | 318 | 318 | 318 |

(Unit: part by weight)

TABLE A1-5

| | Preparation Example A | | | | | | | | | | | |
|---|---|---|---|---|---|---|---|---|---|---|---|---|
| | 55–57 | 58–60 | 61 | 62 | 63 | 64 | 65 | 66 | 67 | 68 | 69 | 70 |
| Solvent | | | | | | | | | | | | |
| SHELLSOL 70 | 80 | | 80 | 80 | 80 | 80 | 80 | 80 | 80 | 80 | 80 | 80 |
| Xylene | | 80 | | | | | | | | | | |
| Polyolefin (A1-1) | 30 | 30 | 50 | 70 | 30 | 30 | 30 | 30 | 30 | 50 | 50 | 50 |
| Copolymerizable monomer (C) | | | | | | | | | | | | |
| Styrene | 7 | 7 | 5 | 3 | 7 | 7 | 40 | | 14 | 8 | 8 | 8 |
| Methyl methacrylate | 46.6 | 46.6 | 33.3 | 20 | 46.6 | 46.6 | 13.6 | 7 | | | | |
| Ethyl acrylate | 11.2 | 11.2 | 8 | 4.8 | 11.2 | 11.2 | 11.2 | | | | | |
| Butyl acrylate | | | | | | | | 21 | | 10 | 10 | 10 |
| Butyl methacrylate | | | | | | | | 31.2 | | 29 | 29 | 29 |
| Isobutyl methacrylate | | | | | | | | | 41 | | | |
| 2-Ethylhexyl acrylate | | | | | | | | | 11.2 | | | |
| Hydroxyethyl acrylate | | | | | | | | 10.5 | | | | |
| Hydroxyethyl methacrylate | 4.9 | 4.9 | 3.5 | 2.1 | 4.9 | 4.9 | 4.9 | | 3.5 | 2.5 | 2.5 | 2.5 |
| Methacrylic acid | 0.28 | 0.28 | 0.2 | 0.12 | 0.28 | 0.28 | 0.28 | 0.28 | 0.28 | 0.5 | 0.5 | 0.5 |
| Fats and Oils | | | | | | | | | | | | |
| OLESTER C1000 | | | | | | | | | | 10 | | |
| OLESTER F77-60MS | | | | | | | | | | | 16.7 | |
| Epoxy resin | | | | | | | | | | | | |
| EPOMIK R140 | | | | | | | | | | | | 10 |
| Polymerization initiator | | | | | | | | | | | | |
| PBD | 1 | 1 | 1 | 1 | 1 | | 1 | 1 | 1 | 1.1 | 1.1 | 1.1 |
| AIBN | | | | | | 1 | | | | | | |
| Diluting solvent 1 | | | | | | | | | | | | |
| SHELLSOL 70 | 28 | | 28 | 28 | 28 | 28 | 28 | 28 | 28 | 28 | 21.3 | 28 |
| Xylene | | 28 | | | | | | | | | | |
| Organic peroxide (PBD) | 7 | 7 | 7 | 7 | 30 | 7 | 7 | 7 | 7 | 7 | 7 | 7 |
| Diluting solvent 2 | | | | | | | | | | | | |
| Xylene | 50 | 50 | 50 | 50 | 50 | 50 | 50 | 50 | 50 | 65 | 65 | 65 |

SHELLSOL 70: Isoparaffin solvent (manufactured by Shell Japan, Ltd.)
(Unit: part by weight)

TABLE A1-6

| | Preparation Example A | | | | | | | | | | |
|---|---|---|---|---|---|---|---|---|---|---|---|
| | 71 | 72 | 73 | 74 | 75 | 76 | 77 | 78 | 79 | 80 | 81 |
| Solvent | | | | | | | | | | | |
| SHELLSOL 70 | 80 | 80 | 80 | 80 | 80 | 80 | 80 | 80 | 80 | 80 | 80 |
| Polyolefin (A1-1) | 50 | 50 | 50 | 50 | 50 | 50 | 50 | 50 | 50 | 50 | 50 |
| Copolymerizable monomer (C) | | | | | | | | | | | |
| Styrene | 8 | 8 | 8 | 8 | 8 | 8 | 8 | 8 | 8 | 8 | 8 |
| Butyl acrylate | 10 | 10 | 10 | 10 | 10 | 10 | 10 | 10 | 10 | 10 | 10 |
| Butyl methacrylate | 29 | 29 | 29 | 29 | 29 | 29 | 29 | 29 | 29 | 29 | 29 |
| Hydroxyethyl acrylate | 2.5 | 2.5 | 2.5 | 2.5 | 2.5 | 2.5 | 2.5 | 2.5 | 2.5 | 2.5 | 2.5 |
| Methacrylic acid | 0.5 | 0.5 | 0.5 | 0.5 | 0.5 | 0.5 | 0.5 | 0.5 | 0.5 | 0.5 | 0.5 |
| Fats and Oils | | | | | | | | | | | |
| OLESTER C1000 | | | | 10 | 10 | | | | 10 | 10 | 10 |
| OLESTER C1000 modified resin | | | | | | 10 | | | 5 | | |
| Epoxy resin | | | | | | | | | | | |
| EPOMIK R140 | | | 5 | | | | | | | | |
| DENACOL EX941 | 10 | | | | | | | | | | |
| EPOMIK R140 modified resin | | | | | | | 10 | | 5 | | |
| Polyester resin | | | | | | | | | | | |
| ALMATEX P646 | | 16.7 | | | | | | | | | |
| OLESTER Q173 | | | 10 | | 5 | | | | | | |

TABLE A1-6-continued

| | Preparation Example A | | | | | | | | | | |
|---|---|---|---|---|---|---|---|---|---|---|---|
| | 71 | 72 | 73 | 74 | 75 | 76 | 77 | 78 | 79 | 80 | 81 |
| ALMATEX P646 modified resin | | | | | | | | 16.7 | | | 8.3 |
| Polymerization initiator | | | | | | | | | | | |
| PBD | 1.1 | 1.1 | 1.1 | 1.1 | 1.1 | 1.1 | 1.1 | 1.1 | 1.1 | 1.1 | 1.1 |
| Diluting solvent 1 | | | | | | | | | | | |
| SHELLSOL 70 | 28 | 21.3 | 28 | 28 | 28 | 28 | 28 | 21.3 | 28 | 28 | 24.7 |
| Organic peroxide (PBD) | 7 | 7 | 7 | 7 | 7 | 7 | 7 | 7 | 7 | 7 | 7 |
| Diluting solvent 2 | | | | | | | | | | | |
| Xylene | 65 | 65 | 65 | 72.5 | 72.5 | 65 | 65 | 65 | 72.5 | 72.5 | 72.5 |

SHELLSOL 70: Isoparaffin solvent (manufactured by Shell Japan, Ltd.)
(Unit: part by weight)

Preparation Examples A82 to A86
[Preparation of Resin Solution (a) Containing Modified Polyolefin (A1-2) or (A1-3)]

In each example, 100 parts of the resin solution (a) prepared in Preparation Example A1, A28, A55, A58 or A61 was distilled at 100° C. under reduced pressure to remove 54 parts of a solvent. To the solution, 54 parts of propylene glycol monomethylether acetate was added to obtain a resin solution (a) containing a modified polyolefin (A1-2) or (A1-3).

Preparation Examples A87 to A96
[Preparation of Resin Solution (a) Containing Curing Agent]

Each of the resin solutions prepared in Preparation Examples A1, A28, A55, A58, A61 and A82 to A86 was mixed with OLESTER NM89-50GPI200 (Trade name; Mitsui chemicals, Inc. Non-volatile components 50%, NCO content 6%) which was a curing agent containing an isocyanate group (referred to as NCO) in such amounts that the molar ratio of OH to NCO of 1/1, to obtain a resin solution (a) containing the curing agent The kind and Mw of the polyolefins (A1-1) used above are as follows. In Preparation Examples A1, A5 to A27, A28, A32 to A54, A55, A58 and A61 to A81, VESTOPLAST VP 750 (Trade name; manufactured by Hüls Japan Co.,Ltd. Mw=70000, C2/C3/C4=11/66/23 (molar ratio)) was used as the polyolefin (A1-1). In preparation Examples A2, A29, A56 and A59, VESTOPLAST VP708 (Trade name; manufactured by Hüls Japan Co., Ltd. Mw=45000, C2/C3/C4=12/68/20 (molar ratio)) was used.). In preparation Examples A3 and A30, TAFMER S 4020(Trade name; manufactured by Mitsui Chemicals Inc. C2/C3=40/60 (molar ratio)) was used. In preparation Examples A4, A31, A57 and A60, UBE TAC UT 2715 (Trade name; manufactured by Ube Industries Ltd. Mw=30000, C3/C4=65/35 (molar ratio)) was used. In the above, C2 indicates an ethylene component, C3 indicates a propylene component and C4 indicates a butene component.

Further, with regard to the third component used above, OLESTER C1000 (Trade name; manufactured by Mitsui Chemicals Inc. oily polyol, non-volatile components 100%, hydroxyl group valence 160 mgKOH/g) and OLESTER F77-60MS (Trade name; manufactured by Mitsui Chemicals Inc. oil modified polyurethane resin, non-volatile components 60%) were fats and oils or derivatives thereof. EPOMIK R140 (Trade name; manufactured by Mitsui Chemicals Inc., non-volatile components 100%, EPOXY equivalent 190 g/eq) and DENACOL EX941 (Trade name; manufactured by Nagase Chemtex, non-volatile components 100%, epoxy equivalent 172 g/eq) were epoxy resins. ALMATEX P646 (Trade name; manufactured by Mitsui Chemicals Inc. non-volatile components 60%, hydroxyl group valence 35 mgKOH/g) and OLESTER Q173 (Trade name; manufactured by Mitsui Chemicals Inc., non-volatile components 100%, hydroxyl group valence 245 mgKOH/g) were polyester resins. Further, SHELLSOL 70 (Trade name) used above was an isoparaffin organic solvent manufactured by Shell Japan Ltd.

Furthermore, the OLESTER C1000 modified resin having a polymerizable unsaturated bond in the molecule was prepared by adding 1.4 parts of maleic anhydride to 100 parts of OLESTER C1000 and stirring at 100° C. for 3 hr, thereby performing addition of maleic anhydride.

The EPOMIK R140 modified resin having a polymerizable unsaturated bond in the molecule was prepared by adding 1.2 parts of maleic anhydride to 100 parts of EPOMIK R140 and stirring at 100° C. for 3 hr, thereby performing addition of maleic anhydride.

The ALMATEX P646 modified resin having a polymerizable unsaturated bond in the molecule was prepared by adding 0.04 part of maleic anhydride to 100 parts of ALMATEX P646 and stirring at 100° C. for 3 hr, thereby performing addition of maleic anhydride.

Examples A1 to A96

In each example, to the resin solution (a) prepared in the above preparation example, IRGACURE 500, which was a photo-polymerization initiator (d) (Trade name; manufactured by Ciba Speciality Chemicals, eutectic mixture of 1-hydroxy-cyclohexyl-phenyl-ketone and benzophenone), was added in an amount of 2 parts based on 100 parts of the resin component to obtain a resin composition.

Examples A97 to A106

In each example, to the resin solution (a) prepared in Preparation Example A1, A28, A55, A58, A61 or A82 to A86, IRGACURE 184, which was a photo-polymerization initiator (d) (Trade name; manufactured by Ciba Speciality Chemicals, 1-hydroxy-cyclohexyl-phenyl-ketone), was added in an amount of 2 parts based on 100 parts of the resin component to obtain a resin composition.

Examples A107 to A116

In each example, to the resin solution (a) prepared in Preparation Example A1, A28, A55, A58, A61 or A82 to A86, IRGACURE 500, which was a photo-polymerization initiator (d), was added in an amount of 4 parts based on 100 parts of the resin component to obtain a resin composition.

Example A117

To the resin solution (a) prepared by the process of Example 2 described in JP-B-62-21027/1987, IRGACURE 500, which was a photo-polymerization initiator (d), was added in an amount of 2 parts based on 100 parts of the resin component to obtain a resin composition.

Comparative Examples A1 to A10

In each example, the resin solution (a) prepared in Preparation Example A1, A28, A55, A58, A61 or A82 to A86 was used as a specimen without addition of a photo-polymerization initiator.

Comparative Example A11

The resin solution (a) prepared by the process of Example 2 described in JP-B-62-21027/1987 was used as a specimen.

In Examples A1 to A117 and Comparative Examples A1 to A11, the following properties were determined and evaluated.

(1) Viscosity of Resin Composition

The obtained resin composition was regulated with the same solvent as used in preparation of the resin solution (a) so that the content of non-volatile components was 30%, and the time of drop(sec) was measured at 25° C. using Ford cup No. 4 in accordance with JIS K 5400. The results in Examples are shown in Table A2 and the results in Comparative Examples are shown in Table A3. With regard to Example A117 and Comparative Example A11, resin compositions regulated to have a content of non-volatile components of 5% with toluene were used for measurement.

(2) Stability of Resin Composition

The obtained resin composition was allowed to stand in a dark room in a non-volatile content of 30% at 40° C. for 1 week, and then the state of the solution was evaluated. After elapse of 1 week, the resin composition, which was observed to be free from separation and precipitation was evaluated as ○, the resin composition, which was observed to have separation and/or precipitation but was easily dispersed by stirring, was evaluated as Δ and the resin composition, which was observed to have separation and/or precipitation and was not easily dispersed by stirring, was evaluated as x. The results of Examples are shown in Table A2 and the results of Comparative Examples are shown in Table A3. With regard to Examples A87 to A96, the test of stability was not conducted. With regard to Example A117 and Comparative Example A11, resin compositions regulated to have a content of non-volatile components of 5% with toluene were used for evaluation.

(3) Sprayability of Resin Composition

Using a coating gun (Wider spray gun (Trade name: W-88-13H5G manufactured by Iwata Tosoki Kogyo Co.), each of the resin compositions prepared in Examples and Comparative Examples was sprayed at a spray pressure of 4 Kg/cm$^2$, with a nozzle opening per rotation in a coating booth having an inside temperature of 30° C., and whether there exists generation of stringiness or not was observed. When no stringiness was observed, the resin composition was evaluated as ○. When at least one string was observed, it was evaluated as x. The results of Examples are shown in Table A2 and the results of Comparative Examples are shown in Table A3.

(4) Evaluation of Adhesion in Sheet

Each of the resin compositions prepared in the above was regulated to have a non-volatile component content of 20% by adding the same solvent as used in the preparation of the resin solution (a). In Example A117 and Comparative Example A11, the non-volatile component content was regulated to 5% with toluene. Subsequently, a sheet made by a polyolefin resin available as TAFMER A-4085 (Trade Name: Mitsui Chemicals Inc. MFR (ASTM D 1238, 190° C., under a load of 2.16 Kg) of 3.6 g/10 min, density (ASTM D 1505) of 0.88 g/cm$^3$) was cleaned with isopropyl alcohol. Thereon, the resin composition was applied with a blush in such a way that the film thickness after drying was 2 μm, and dried at room temperature. Then, using an UV irradiator equipped with one 80 W/cm high-pressure mercury vapor lamp (Model EPSH-600-3S manufactured by JAPAN STORAGE BATTERY CO., LTD.) set vertically to the passing direction, the coated sheet put at a position of 15 cm under a light source was moved at a conveyer speed of 10 m/min, to perform UV light irradiation.

(5) Cross-cut Peel Test

In accordance with the cross-cut peel test described in JIS-K-5400, a specimen having intersecting horizontal and vertical score marks was prepared from the resulting coating film. An adhesive cellophane tape (cello tape: product of NICHIBAN CO.) was adhered to the specimen having intersecting horizontal and vertical score marks and thereafter, the tape was pulled rapidly at 90° and thereby it was peeled off. The specimen was evaluated by the number of non-peeled squares among 100 squares. The results of Examples are shown in Table A2 and the results of Comparative Examples are shown in Table A3.

(6) Follow-up Properties Test

The sheet was folded at 90° and then returned to an initial condition. With regard to the folding part of the sheet, observation of coating appearance and cross-cut peel test were conducted. The sheet having good appearance and no peeling in the folding part was evaluated as ○, the sheet having lifting in the folding part was evaluated as Δ, and the sheet having peeling at the folding was evaluated as x. The results of Examples are shown in Table A2 and the results of Comparative Examples are shown in Tables A3.

(7) Measurement of Peel Strength

On the obtained coating film, a white topcoat paint was applied in such an amount that the thickness after drying was 20 μm, to form a coating film and then allowed to stand at room temperature for 10 min. Thereafter, the coating film-having sheet was put into an oven at 100° C. for thermosetting treatment for 30 min. The peel strength of the coating film was measured.

In the measurement of the peel strength, rifts having a width of 1 cm were formed on the coating film. The end of the coating film was peeled and then pulled at 180° at a rate of 50 mm/min, and thereby the peel strength was measured. The coating film having peel strength of 800 g/cm or more was evaluated as ○, the coating film having peel strength of 400 g/cm or more and less than 800 g/cm was evaluated as Δ, and the coating film having less than 400 g/cm was evaluated as x. The results of Examples are shown in Table A2 and the results of Comparative Examples are shown in Table A3.

The topcoat paint used above was comprised of a main component obtained by dispersing 30 g of Tipeqe-CR93 (Trade Name: manufactured by ISHIHARA SANGYO KAISHA, LTD) in 100 g of OLESTER Q186 (Trade Name: manufactured by Mitsui Chemicals Inc., non-volatile components 50%, valence of hydroxyl group 30 mgKOH/g), and OLESTER NM89-50G (Trade Name: manufactured by Mitsui Chemicals Inc., non-volatile components 50%, NCO content 6%) which is a curing agent having an isocyanate group in a molar ratio OH/NCO of 0.95.

(8) Evaluation of Adhesion in Foamed Article

Each of the obtained resin compositions was regulated to have a non-volatile content of 10% by adding the same solvent used in the preparation of the resin solution (a).

In Example A117 and Comparative Example A11, the non-volatile content was regulated to 5% with toluene. Subsequently, a foamed article prepared by the method as described in Example 1 of JP-A-2000-344924 was immersed in a mixed solvent (methylcyclohexane/isopropyl alcohol/methyl ethyl ketone =65 parts/20 parts/15 parts) for 1 min and the above resin composition was applied thereon with a brush in such an amount that the film thickness after drying was 1 μm and dried. Then, using an UV irradiator equipped with one 80 W/cm high-pressure mercury vapor lamp (Model EPSH-600-3S manufactured by JAPAN STORAGE BATTERY CO., LTD.) set vertically to the passing direction, the foamed article put at a position of 15 cm under a light source was moved at a conveyer speed of 10 m/min, to perform UV light irradiation.

The peel strength test of the coating films obtained after the UV light irradiation was conducted with the following two methods.

<Evaluation 1>

A foamed article was prepared by coating an aqueous urethane resin (BOND ACE W-01 manufactured by Tosei Chemical Co., Ltd.) in such an amount that the film thickness after drying was 5 μm on the coating film of the foamed article obtained after the UV light irradiation in the above, and then drying. A sheet was prepared by coating a primer (D-PLY 007 manufactured by Tosei Chemical Co., Ltd.) in such an amount that the film thickness after drying was 1 μm with a brush on a synthesized rubber sheet cleaned with acetone (Trade Name: NIPOL BR1220 available from JSR Co., Ltd.), further coating an aqueous urethane resin (BOND ACE W-01 manufactured by Tosei Chemical Co., Ltd.) in such an amount that the film thickness after drying was 5 μm with a brush and then drying. They were bonded at 60° C. at a pressure of 40 Kg/m² for 10 sec and then allowed to stand 48 hr.

Subsequently, rifts having a width of 1 cm were formed on the coating film of the rubber sheet prepared above. The end of the coating film of the rubber sheet was peeled and then pulled at 180° at a rate of 200 mm/min, and thereby the peel strength was measured. The coating film having peel strength of 3 Kg/cm or more was evaluated as ○, the coating film having peel strength of 1.5 Kg/cm or more and less than 3 Kg/cm was evaluated as Δ, and the coating film having less than 1.5 Kg/cm was evaluated as x. The results of Examples are shown in Table A2 and the results of Comparative Examples are shown in Table A3.

<Evaluation 2>

A foamed article was prepared by coating an aqueous urethane resin (BOND ACE W-01 manufactured by Tosei Chemical Co., Ltd.) in such an amount that the film thickness after drying was 5 μm with a brush on the coating film prepared after the UV light irradiation in the above, and then drying. A sheet was prepared by coating with a primer (BOND ACE 232H manufactured by Tosei Chemical Co., Ltd.) in such an amount that the film thickness after drying was 1 μm with a brush on a urethane sheet (DRY method made polyurethane sheet for shoes available from Dae Jin Synthesis Chemical), further coating with an aqueous urethane resin (BOND ACE W-01 manufactured by Tosei Chemical Co., Ltd.) in such an amount that the film thickness after drying was 5 μm with a brush and then drying. They were bonded at 60° C. at a pressure 40 Kg/m² for 10 sec and then allowed to stand 48 hr. Subsequently, rifts having a width of 1 cm were formed on the coating film of the urethane sheet prepared above. The end of the coating film of the urethane sheet was peeled and then pulled at 180° at a rate of 200 mm/min, and thereby the peel strength was measured. The coating film having peel strength of 3 Kg/cm or more was evaluated as o, the coating film having peel strength of 1.5 Kg/cm or more and less than 3 Kg/cm was evaluated as Δ, and the coating film having less than 1.5 Kg/cm was evaluated as x. The results of Examples are shown in Table A2 and the results of Comparative Examples are shown in Table A3.

TABLE A2

| | Example A | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| Solution Properties | | | | | | | | | | | | | | | | |
| Solution viscosity (sec) | 25 | 22 | 35 | 20 | 26 | 27 | 27 | 24 | 26 | 24 | 28 | 29 | 28 | 29 | 30 | 24 |
| Stability | ○ | ○ | ○ | ○ | ○ | ○ | ○ | ○ | ○ | ○ | ○ | ○ | ○ | ○ | ○ | ○ |
| Suitability for Spray | ○ | ○ | ○ | ○ | ○ | ○ | ○ | ○ | ○ | ○ | ○ | ○ | ○ | ○ | ○ | ○ |
| Evaluation in Sheets | | | | | | | | | | | | | | | | |
| Cross-cut peel test | 100 | 100 | 100 | 100 | 100 | 100 | 100 | 100 | 100 | 100 | 100 | 100 | 100 | 100 | 100 | 100 |
| Follow-up test | ○ | ○ | ○ | ○ | ○ | ○ | ○ | ○ | ○ | ○ | ○ | ○ | ○ | ○ | ○ | ○ |
| Peel strength test | ○ | ○ | ○ | ○ | ○ | ○ | ○ | ○ | ○ | ○ | ○ | ○ | ○ | ○ | ○ | ○ |
| Evaluation in Foamed articles | | | | | | | | | | | | | | | | |
| Evaluation 1 Rubber | ○ | ○ | ○ | ○ | ○ | ○ | ○ | ○ | ○ | ○ | ○ | ○ | ○ | ○ | ○ | ○ |

TABLE A2-continued

| | | | | | | | | | | | | | | | | |
|---|---|---|---|---|---|---|---|---|---|---|---|---|---|---|---|---|
| Evaluation 2 Urethane sheet | ○ | ○ | ○ | ○ | ○ | ○ | ○ | ○ | ○ | ○ | ○ | ○ | ○ | ○ | ○ | ○ |

| | Example A | | | | | | | | | | | | | | | |
|---|---|---|---|---|---|---|---|---|---|---|---|---|---|---|---|---|
| | 17 | 18 | 19 | 20 | 21 | 22 | 23 | 24 | 25 | 26 | 27 | 28 | 29 | 30 | 31 | 32 |
| Solution Properties | | | | | | | | | | | | | | | | |
| Solution viscosity (sec) | 22 | 27 | 29 | 27 | 29 | 31 | 27 | 30 | 32 | 28 | 30 | 32 | 31 | 40 | 27 | 30 |
| Stability | ○ | ○ | ○ | ○ | ○ | ○ | ○ | ○ | ○ | ○ | ○ | ○ | ○ | ○ | ○ | ○ |
| Suitability for Spray | ○ | ○ | ○ | ○ | ○ | ○ | ○ | ○ | ○ | ○ | ○ | ○ | ○ | ○ | ○ | ○ |
| Evaluation in Sheets | | | | | | | | | | | | | | | | |
| Cross-cut peel test | 100 | 100 | 100 | 100 | 100 | 100 | 100 | 100 | 100 | 100 | 100 | 100 | 100 | 100 | 100 | 100 |
| Follow-up test | ○ | ○ | ○ | ○ | ○ | ○ | ○ | ○ | ○ | ○ | ○ | ○ | ○ | ○ | ○ | ○ |
| Peel strength test | ○ | ○ | ○ | ○ | ○ | ○ | ○ | ○ | ○ | ○ | ○ | ○ | ○ | ○ | ○ | ○ |
| Evaluation in Foamed articles | | | | | | | | | | | | | | | | |
| Evaluation 1 Rubber | ○ | ○ | ○ | ○ | ○ | ○ | ○ | ○ | ○ | ○ | ○ | ○ | ○ | ○ | ○ | ○ |
| Evaluation 2 Urethane sheet | ○ | ○ | ○ | ○ | ○ | ○ | ○ | ○ | ○ | ○ | ○ | ○ | ○ | ○ | ○ | ○ |

| | Example A | | | | | | | | | | | | | | | |
|---|---|---|---|---|---|---|---|---|---|---|---|---|---|---|---|---|
| | 33 | 34 | 35 | 36 | 37 | 38 | 39 | 40 | 41 | 42 | 43 | 44 | 45 | 46 | 47 | 48 |
| Solution Properties | | | | | | | | | | | | | | | | |
| Solution viscosity (sec) | 35 | 32 | 30 | 30 | 33 | 43 | 39 | 48 | 39 | 40 | 35 | 34 | 36 | 38 | 37 | 39 |
| Stability | ○ | ○ | ○ | ○ | ○ | ○ | ○ | ○ | ○ | ○ | ○ | ○ | ○ | ○ | ○ | ○ |
| Suitability for Spray | ○ | ○ | ○ | ○ | ○ | ○ | ○ | ○ | ○ | ○ | ○ | ○ | ○ | ○ | ○ | ○ |
| Evaluation in Sheets | | | | | | | | | | | | | | | | |
| Cross-cut peel test | 100 | 100 | 100 | 100 | 100 | 100 | 100 | 100 | 100 | 100 | 100 | 100 | 100 | 100 | 100 | 100 |
| Follow-up test | ○ | ○ | ○ | ○ | ○ | ○ | ○ | ○ | ○ | ○ | ○ | ○ | ○ | ○ | ○ | ○ |
| Peel strength test | ○ | ○ | ○ | ○ | ○ | ○ | ○ | ○ | ○ | ○ | ○ | ○ | ○ | ○ | ○ | ○ |
| Evaluation in Foamed articles | | | | | | | | | | | | | | | | |
| Evaluation 1 Rubber | ○ | ○ | ○ | ○ | ○ | ○ | ○ | ○ | ○ | ○ | ○ | ○ | ○ | ○ | ○ | ○ |
| Evaluation 2 Urethane sheet | ○ | ○ | ○ | ○ | ○ | ○ | ○ | ○ | ○ | ○ | ○ | ○ | ○ | ○ | ○ | ○ |

| | Example A | | | | | | | | | | | | | | | |
|---|---|---|---|---|---|---|---|---|---|---|---|---|---|---|---|---|
| | 49 | 50 | 51 | 52 | 53 | 54 | 55 | 56 | 57 | 58 | 59 | 60 | 61 | 62 | 63 | 64 |
| Solution Properties | | | | | | | | | | | | | | | | |
| Solution viscosity (sec) | 42 | 37 | 38 | 42 | 39 | 40 | 25 | 21 | 17 | 40 | 37 | 30 | 34 | 47 | 21 | 26 |
| Stability | ○ | ○ | ○ | ○ | ○ | ○ | ○ | ○ | ○ | ○ | ○ | ○ | ○ | ○ | ○ | ○ |
| Suitability for Spray | ○ | ○ | ○ | ○ | ○ | ○ | ○ | ○ | ○ | ○ | ○ | ○ | ○ | ○ | ○ | ○ |
| Evaluation in Sheets | | | | | | | | | | | | | | | | |
| Cross-cut peel test | 100 | 100 | 100 | 100 | 100 | 100 | 100 | 100 | 100 | 100 | 100 | 100 | 100 | 100 | 100 | 100 |
| Follow-up test | ○ | ○ | ○ | ○ | ○ | ○ | ○ | ○ | ○ | ○ | ○ | ○ | ○ | ○ | ○ | ○ |
| Peel strength test | ○ | ○ | ○ | ○ | ○ | ○ | ○ | ○ | ○ | ○ | ○ | ○ | ○ | ○ | ○ | ○ |
| Evaluation in Foamed articles | | | | | | | | | | | | | | | | |
| Evaluation 1 Rubber | ○ | ○ | ○ | ○ | ○ | ○ | ○ | ○ | ○ | ○ | ○ | ○ | ○ | ○ | ○ | ○ |

TABLE A2-continued

| | | | | | | | | | | | | | | | | |
|---|---|---|---|---|---|---|---|---|---|---|---|---|---|---|---|---|
| Evaluation 2 Urethane sheet | ○ | ○ | ○ | ○ | ○ | ○ | ○ | ○ | ○ | ○ | ○ | ○ | ○ | ○ | ○ | ○ |

| | Example A | | | | | | | | | | | | | | | |
|---|---|---|---|---|---|---|---|---|---|---|---|---|---|---|---|---|
| | 65 | 66 | 67 | 68 | 69 | 70 | 71 | 72 | 73 | 74 | 75 | 76 | 77 | 78 | 79 | 80 |
| Solution Properties | | | | | | | | | | | | | | | | |
| Solution viscosity (sec) | 26 | 27 | 25 | 27 | 29 | 24 | 23 | 27 | 28 | 25 | 27 | 29 | 26 | 29 | 30 | 27 |
| Stability | ○ | ○ | ○ | ○ | ○ | ○ | ○ | ○ | ○ | ○ | ○ | ○ | ○ | ○ | ○ | ○ |
| Suitability for Spray | ○ | ○ | ○ | ○ | ○ | ○ | ○ | ○ | ○ | ○ | ○ | ○ | ○ | ○ | ○ | ○ |
| Evaluation in Sheets | | | | | | | | | | | | | | | | |
| Cross-cut peel test | 100 | 100 | 100 | 100 | 100 | 100 | 100 | 100 | 100 | 100 | 100 | 100 | 100 | 100 | 100 | 100 |
| Follow-up test | ○ | ○ | ○ | ○ | ○ | ○ | ○ | ○ | ○ | ○ | ○ | ○ | ○ | ○ | ○ | ○ |
| Peel strength test | ○ | ○ | ○ | ○ | ○ | ○ | ○ | ○ | ○ | ○ | ○ | ○ | ○ | ○ | ○ | ○ |
| Evaluation in Foamed articles | | | | | | | | | | | | | | | | |
| Evaluation 1 Rubber | ○ | ○ | ○ | ○ | ○ | ○ | ○ | ○ | ○ | ○ | ○ | ○ | ○ | ○ | ○ | |
| Evaluation 2 Urethane sheet | ○ | ○ | ○ | ○ | ○ | ○ | ○ | ○ | ○ | ○ | ○ | ○ | ○ | ○ | ○ | |

| | Example A | | | | | | | | | | | | | | | |
|---|---|---|---|---|---|---|---|---|---|---|---|---|---|---|---|---|
| | 81 | 82 | 83 | 84 | 85 | 86 | 87 | 88 | 89 | 90 | 91 | 92 | 93 | 94 | 95 | 96 |
| Solution Properties | | | | | | | | | | | | | | | | |
| Solution viscosity (sec) | 29 | 28 | 35 | 27 | 41 | 36 | 29 | 36 | 30 | 44 | 37 | 31 | 35 | 33 | 41 | 40 |
| Stability | ○ | ○ | ○ | ○ | ○ | ○ | | | | | | | ○ | ○ | ○ | ○ |
| Suitability for Spray | ○ | ○ | ○ | ○ | ○ | ○ | ○ | ○ | ○ | ○ | ○ | ○ | ○ | ○ | ○ | ○ |
| Evaluation in Sheets | | | | | | | | | | | | | | | | |
| Cross-cut peel test | 100 | 100 | 100 | 100 | 100 | 100 | 100 | 100 | 100 | 100 | 100 | 100 | 100 | 100 | 100 | 100 |
| Follow-up test | ○ | ○ | ○ | ○ | ○ | ○ | ○ | ○ | ○ | ○ | ○ | ○ | ○ | ○ | ○ | ○ |
| Peel strength test | ○ | ○ | ○ | ○ | ○ | ○ | ○ | ○ | ○ | ○ | ○ | ○ | ○ | ○ | ○ | ○ |
| Evaluation in Foamed articles | | | | | | | | | | | | | | | | |
| Evaluation 1 Rubber | ○ | ○ | ○ | ○ | ○ | ○ | ○ | ○ | ○ | ○ | ○ | ○ | ○ | ○ | ○ | ○ |
| Evaluation 2 Urethane sheet | ○ | ○ | ○ | ○ | ○ | ○ | ○ | ○ | ○ | ○ | ○ | ○ | ○ | ○ | ○ | ○ |

| | Example A | | | | | | | | | | | | | | |
|---|---|---|---|---|---|---|---|---|---|---|---|---|---|---|---|
| | 97 | 98 | 99 | 100 | 101 | 102 | 103 | 104 | 105 | 106 | 107 | 108 | 109 | 110 | 111 |
| Solution Properties | | | | | | | | | | | | | | | |
| Solution viscosity (sec) | 30 | 36 | 31 | 45 | 37 | 32 | 37 | 30 | 44 | 32 | 30 | 35 | 31 | 44 | 37 |
| Stability | ○ | ○ | ○ | ○ | ○ | ○ | ○ | ○ | ○ | ○ | ○ | ○ | ○ | ○ | |
| Suitability for Spray | ○ | ○ | ○ | ○ | ○ | ○ | ○ | ○ | ○ | ○ | ○ | ○ | ○ | ○ | |
| Evaluation in Sheets | | | | | | | | | | | | | | | |
| Cross-cut peel test | 100 | 100 | 100 | 100 | 100 | 100 | 100 | 100 | 100 | 100 | 100 | 100 | 100 | 100 | 100 |
| Follow-up test | ○ | ○ | ○ | ○ | ○ | ○ | ○ | ○ | ○ | ○ | ○ | ○ | ○ | ○ | |
| Peel strength test | ○ | ○ | ○ | ○ | ○ | ○ | ○ | ○ | ○ | ○ | ○ | ○ | ○ | ○ | |
| Evaluation in Foamed articles | | | | | | | | | | | | | | | |
| Evaluation 1 Rubber | ○ | ○ | ○ | ○ | ○ | ○ | ○ | ○ | ○ | ○ | ○ | ○ | ○ | ○ | |

TABLE A2-continued

| | | | | | | | | | | | | | | | | | |
|---|---|---|---|---|---|---|---|---|---|---|---|---|---|---|---|---|---|
| Evaluation 2 Urethane sheet | ○ | ○ | ○ | ○ | ○ | ○ | ○ | ○ | ○ | ○ | ○ | ○ | ○ | ○ | ○ | ○ | ○ |

| | Example A |||||| 
|---|---|---|---|---|---|---|
| | 112 | 113 | 114 | 115 | 116 | 117 |
| Solution Properties | | | | | | |
| Solution viscosity (sec) | 33 | 38 | 29 | 44 | 31 | 17 |
| Stability | ○ | ○ | ○ | ○ | ○ | ○ |
| Suitability for Spray | ○ | ○ | ○ | ○ | ○ | ○ |
| Evaluation in Sheets | | | | | | |
| Cross-cut peel test | 100 | 100 | 100 | 100 | 100 | 100 |
| Follow-up test | ○ | ○ | ○ | ○ | ○ | ○ |
| Peel strength test | ○ | ○ | ○ | ○ | ○ | ○ |
| Evaluation in Foamed articles | | | | | | |
| Evaluation 1 Rubber | ○ | ○ | ○ | ○ | ○ | ○ |
| Evaluation 2 Urethane sheet | ○ | ○ | ○ | ○ | ○ | ○ |

TABLE A3

| | Comparative Example A |||||||||||
|---|---|---|---|---|---|---|---|---|---|---|---|
| | 1 | 2 | 3 | 4 | 5 | 6 | 7 | 8 | 9 | 10 | 11 |
| Solution Properties | | | | | | | | | | | |
| Solution viscosity (sec) | 25 | 32 | 25 | 40 | 34 | 28 | 35 | 27 | 41 | 36 | 17 |
| Stability | ○ | ○ | ○ | ○ | ○ | ○ | ○ | ○ | ○ | ○ | ○ |
| Suitability for Spray | ○ | ○ | ○ | ○ | ○ | ○ | ○ | ○ | ○ | ○ | ○ |
| Evaluation in Sheets | | | | | | | | | | | |
| Cross-cut peel test | 100 | 100 | 100 | 100 | 100 | 100 | 100 | 100 | 100 | 100 | 100 |
| Follow-up test | ○ | ○ | ○ | ○ | ○ | ○ | ○ | ○ | ○ | ○ | ○ |
| Peel strength test | x | x | x | x | x | x | x | x | x | x | Δ |
| Evaluation in Foamed articles | | | | | | | | | | | |
| Evaluation 1 Rubber | Δ | Δ | Δ | Δ | Δ | Δ | Δ | Δ | Δ | Δ | Δ |
| Evaluation 2 Urethane sheet | x | x | x | x | x | x | x | x | x | x | Δ |

Preparation Examples B1 to B25
[Preparation of (Co)Polymer (B)]

In each example, to a four neck flask equipped with a stirrer, thermometer, reflux condenser and nitrogen-feeding tube, a solvent as described in the synthesis of the (co)polymer (B) in Tables B1-1 and B1-2 was charged and heated to 100° C. while purging with nitrogen.

Subsequently, therein, a mixed solution of a copolymerizable monomer (C) and a polymerization initiator as described in the synthesis of the (co)polymer (B) in Tables B1-1 and B1-2 was fed over 4 hr and then after 1 hr from the completion of the feeding, 0.4 part of PBO (t-butylperoxy-2-ethylhexanoate) was added and allowed to react for 2 hr. Thereafter, the reaction mixture was diluted to have a non-volatile component content of 50% by adding a diluting solvent as described in the synthesis of the (co)polymer (B) in the above tables, and thereby a (co)polymer (B) was prepared.

Preparation Examples B26 to B50
[Preparation of Carboxylic Anhydride-added (Co)Polymer (B)]

In each example, to a four neck flask equipped with a stirrer, thermometer, reflux condenser and nitrogen-feeding tube, a solvent as described in the synthesis of the (co)polymer (B) in Tables B1-3 and B1-4 was charged and heated to 100° C. while purging with nitrogen.

Subsequently, into the flask, a mixed solution of a copolymerizable monomer (C) and a polymerization initiator as described in the synthesis of the (co)polymer (B) in Tables B1-3 and B1-4 was fed over 4 hr and then after 1 hr from the completion of the feeding, 0.4 part of PBO was added and allowed to stand for 2 hr. Thereafter, the reaction mixture was diluted to have a non-volatile component content of 50% by adding a diluting solvent as described in the synthesis of the (co)polymer (B). The temperature was raised to 100° C. and carboxylic anhydride as described in the addition of carboxylic anhydride in Tables B1-3 to B1-4 was added to the reaction mixture and reacted for 1 hr, to prepare a carboxylic anhydride-added (co)polymer (B)

Preparation Examples B1 to B50
[Preparation of Modified Styrene Thermoplastic Elastomer (A2-2)-containing Resin Solution (a)]

In each example, to the solution of the (co)polymer (B) or the solution of the carboxylic anhydride-added (co)polymer (B), the styrene thermoplastic elastomer (A2-1) and the solvent as described in the reaction of Tables B1-1 to B1-4, and further in Preparation Examples B12 to B25, and B37 to B50, a third component described in the above tables were added and then heated to 135° C. while purging with nitrogen. In the case that the solvent is methylcyclohexane, they were heated to 100° C.

Subsequently, into the flask, an organic peroxide in such an amount as described in the reaction of Tables B1-1 and B1-4 was fed. The organic peroxide used herein was PBO or PBD(di-tert-butylperoxide). After completion of the organic peroxide addition, the reaction was conducted for 2 hr. Thereafter, the reaction mixture was diluted to have a non-volatile component content of 30% by adding the same diluting solvent as described above, and thereby a resin solution (a) containing a modified styrene thermoplastic elastomer (A-2) was prepared.

Preparation Examples B51 to B77
[Preparation of Resin Solution (a) Containing Modified Styrene Thermoplastic Elastomer (A2-3)]

In each example, to a four neck flask equipped with a stirrer, thermometer, reflux condenser and nitrogen-feeding tube, a styrene thermoplastic elastomer (A2-1) and a solvent as described in Tables B1-5 and B1-6 were charged and heated to 130° C. while purging with nitrogen.

To the flask, a mixed solution comprising a copolymerizable monomer (C) and a polymerization initiator as described in Tables B1-5 to B1-6, and further in Preparation Examples B64 to B77, a third component described in Tables B1-5 and B1-6 was fed over 4 hr. After 30 min from the completion of the feeding, the mixture was heated to 135° C. and then after 30 min, a polymerization initiator as described in Tables B1-5 to B1-6 was added in such an amount as described in the tables. After 30 min from the addition of the polymerization initiator, the mixture was heated to 160° C. Further, after 30 min, an organic peroxide in such an amount as described in the reaction of Tables B1-5 and B1-6 was fed and the reaction was conducted. After completion of the organic peroxide addition, the mixture was allowed to stand for 2 hr and thereby the reaction was conducted, to prepare a resin solution (a) containing a modified styrene thermoplastic elastomer (A-3) having a non-volatile component content of 40%. In the case that the solvent was methylcyclohexane or toluene, the reaction was conducted at 100° C.

In Preparation Example 60, to a four neck flask equipped with a stirrer, thermometer, reflux condenser and nitrogen-feeding tube, a styrene thermoplastic elastomer (A2-1) and a solvent as shown in Tables B1-5 were charged and heated to 100° C. while purging with nitrogen. To the flask, a mixed solution comprising a copolymerizable monomer (C) and AIBN (azobisisobutylonitrile) as a polymerization initiator as described in Tables B1-5 was fed over 4 hr. After 90 min from the completion of the feeding, 0.75 part of AIBN was added. After 30 min from the AIBN addition, the mixture was heated to 160° C. Further, after 30 min, PBD which was an organic peroxide in such an amount as described in the reaction of Tables B1-5 was fed and thereby the reaction was conducted. After completion of the PBD addition, the mixture was allowed to stand for 2 hr and thereby reacted, to prepare a resin solution (a) containing a modified styrene thermoplastic elastomer (A2-3) and having a non-volatile component content of 40%.

TABLE B1-1

| | Preparation Example B | | | | | | | | | | | |
|---|---|---|---|---|---|---|---|---|---|---|---|---|
| | 1,2 | 3 | 4 | 5 | 6 | 7 | 8 | 9 | 10 | 11 | 12 | 13 |
| Synthesis of (co)polymer (B) | | | | | | | | | | | | |
| Solvent | | | | | | | | | | | | |
| Xylene | 80 | 80 | 80 | 80 | | 80 | 80 | 80 | 80 | 80 | 80 | 80 |
| Toluene | | | | | 80 | | | | | | | |
| Copolymerizable monomer (C) | | | | | | | | | | | | |
| Styrene | 10 | 10 | 10 | 10 | 10 | 10 | 61.6 | | | | 15 | 15 |
| Methyl methacrylate | 61.6 | 61.6 | 61.6 | 61.6 | 63.6 | 54.8 | 10 | 50.6 | 50.6 | 50.6 | | |
| Ethyl acrylate | 16 | 16 | 16 | 16 | 16 | 16 | 16 | | | | | |
| Butyl acrylate | | | | | | | | | | | 20 | 20 |
| Butyl methacrylate | | | | | | | | | | | 54 | 54 |
| Isobutyl methacrylate | | | | | | | | 30 | 30 | 30 | | |
| Hydroxyethyl methacrylate | 7 | 7 | 7 | 7 | 5 | 14 | 7 | 14 | 14 | 14 | 5 | 5 |
| FM-3 | 5 | 5 | 5 | 5 | 5 | 5 | 5 | 5 | 5 | 5 | 5 | 5 |
| Acrylic acid | | | | | | 0.4 | | | | | | |
| Methacrylic acid | 0.4 | 0.4 | 0.4 | 0.4 | 0.4 | | 0.4 | 0.4 | 0.4 | 0.4 | 1 | 1 |

TABLE B1-1-continued

|  | Preparation Example B | | | | | | | | | | | |
|---|---|---|---|---|---|---|---|---|---|---|---|---|
|  | 1,2 | 3 | 4 | 5 | 6 | 7 | 8 | 9 | 10 | 11 | 12 | 13 |
| Polymerization initiator (PBO) | 1.5 | 1.5 | 1.5 | 1.5 | 1.5 | 1.5 | 1.5 | 1.5 | 1.5 | 1.5 | 1.5 | 1.5 |
| Diluting solvent |  |  |  |  |  |  |  |  |  |  |  |  |
| Xylene | 20 | 20 | 20 | 20 |  | 20 | 20 | 20 | 20 | 20 | 20 | 20 |
| Methylcyclohexane |  |  |  |  | 20 |  |  |  |  |  |  |  |
| Reaction |  |  |  |  |  |  |  |  |  |  |  |  |
| Styrene TPE (A2-1) | 100 | 43 | 233 | 100 | 100 | 100 | 100 | 100 | 43 | 233 | 100 | 100 |
| Fats and Oils |  |  |  |  |  |  |  |  |  |  |  |  |
| OLESTER C1000 |  |  |  |  |  |  |  |  |  |  | 20 |  |
| OLESTER F77-60MS |  |  |  |  |  |  |  |  |  |  |  | 33.3 |
| Solvent |  |  |  |  |  |  |  |  |  |  |  |  |
| Xylene | 100 | 43 | 233 | 100 |  | 100 | 100 | 100 | 43 | 233 | 100 | 86.7 |
| Methylcyclohexane |  |  |  |  | 100 |  |  |  |  |  |  |  |
| Organic peroxide |  |  |  |  |  |  |  |  |  |  |  |  |
| PBO |  |  |  |  | 21 |  |  |  |  |  |  |  |
| PBD | 14 | 10 | 23.3 | 23.3 |  | 23.3 | 14 | 14 | 10 | 23.3 | 14 | 14 |
| Diluting solvent |  |  |  |  |  |  |  |  |  |  |  |  |
| Xylene | 267 | 191 | 444 | 267 |  | 267 | 267 | 267 | 191 | 444 | 313 | 313 |
| Methylcyclohexane |  |  |  |  | 267 |  |  |  |  |  |  |  |

1) FM-3: Lactone modified hydroxyethyl methacrylate (manufactured by Daicel Chemical Industries, Ltd.)
2) TPE of Styrene TPE (A2-1): Thermoplastic elastomer
3) Unit: part by weight

TABLE B1-2

|  | Preparation Example B | | | | | | | | | | | |
|---|---|---|---|---|---|---|---|---|---|---|---|---|
|  | 14 | 15 | 16 | 17 | 18 | 19 | 20 | 21 | 22 | 23 | 24 | 25 |
| Synthesis of (co)polymer (B) |  |  |  |  |  |  |  |  |  |  |  |  |
| Solvent |  |  |  |  |  |  |  |  |  |  |  |  |
| Xylene | 80 | 80 | 80 | 80 | 80 | 80 | 80 | 80 | 80 | 80 | 80 | 80 |
| Copolymerizable monomer (C) |  |  |  |  |  |  |  |  |  |  |  |  |
| Styrene | 15 | 15 | 15 | 15 | 15 | 15 | 15 | 15 | 15 | 15 | 15 | 15 |
| Butyl acrylate | 20 | 20 | 20 | 20 | 20 | 20 | 20 | 20 | 20 | 20 | 20 | 20 |
| Butyl methacrylate | 54 | 54 | 54 | 54 | 54 | 54 | 54 | 54 | 54 | 54 | 54 | 54 |
| Hydroxyethyl methacrylate | 5 | 5 | 5 | 5 | 5 | 5 | 5 | 5 | 5 | 5 | 5 | 5 |
| FM-3 | 5 | 5 | 5 | 5 | 5 | 5 | 5 | 5 | 5 | 5 | 5 | 5 |
| Methacrylic acid | 1 | 1 | 1 | 1 | 1 | 1 | 1 | 1 | 1 | 1 | 1 | 1 |
| Polymerization initiator (PBO) | 1.5 | 1.5 | 1.5 | 1.5 | 1.5 | 1.5 | 1.5 | 1.5 | 1.5 | 1.5 | 1.5 | 1.5 |
| Diluting solvent |  |  |  |  |  |  |  |  |  |  |  |  |
| Xylene | 20 | 20 | 20 | 20 | 20 | 20 | 20 | 20 | 20 | 20 | 20 | 20 |
| Reaction |  |  |  |  |  |  |  |  |  |  |  |  |
| Styrene TPE (A2-1) | 100 | 100 | 100 | 100 | 100 | 100 | 100 | 100 | 100 | 100 | 100 | 100 |
| Fats and Oils |  |  |  |  |  |  |  |  |  |  |  |  |
| OLESTER C1000 |  |  |  |  | 20 | 20 |  |  |  | 15 | 15 | 15 |
| OLESTER C1000 modified resin |  |  |  |  |  |  | 20 |  |  | 5 |  |  |
| Epoxy resin |  |  |  |  |  |  |  |  |  |  |  |  |
| EPOMIK R140 | 20 |  |  |  | 10 |  |  |  |  |  |  |  |
| DENACOL EX941 |  | 20 |  |  |  |  |  |  |  |  |  |  |
| EPOMIK R140 modified resin |  |  |  |  |  |  |  | 20 |  |  | 5 |  |
| Polyester resin |  |  |  |  |  |  |  |  |  |  |  |  |
| ALMATEX P646 |  |  | 33.3 |  |  |  |  |  |  |  |  |  |
| OLESTER Q173 |  |  |  | 20 |  | 10 |  |  |  |  |  |  |

TABLE B1-2-continued

|  | Preparation Example B | | | | | | | | | | | |
|---|---|---|---|---|---|---|---|---|---|---|---|---|
|  | 14 | 15 | 16 | 17 | 18 | 19 | 20 | 21 | 22 | 23 | 24 | 25 |
| ALMATEX P646 modified resin |  |  |  |  |  |  |  |  | 33.3 |  |  | 8.3 |
| Solvent |  |  |  |  |  |  |  |  |  |  |  |  |
| Xylene | 100 | 100 | 86.7 | 100 | 100 | 100 | 100 | 100 | 86.7 | 100 | 100 | 96.7 |
| Organic peroxide |  |  |  |  |  |  |  |  |  |  |  |  |
| PBD | 14 | 14 | 14 | 14 | 14 | 14 | 14 | 14 | 14 | 14 | 14 | 14 |
| Diluting solvent |  |  |  |  |  |  |  |  |  |  |  |  |
| Xylene | 313 | 313 | 313 | 313 | 337 | 337 | 313 | 313 | 313 | 313 | 313 | 313 |

1) FM-3: Lactone modified hydroxyethyl methacrylate (manufactured by Daicel Chemical Industries, Ltd.)
2) TPE of Styrene TPE (A2-1): Thermoplastic elastomer
3) Unit: part by weight

TABLE B1-3

|  | Preparation Example B | | | | | | | | | | |
|---|---|---|---|---|---|---|---|---|---|---|---|
|  | 26, 27 | 28 | 29 | 30 | 31 | 32 | 33 | 34 | 35 | 36 | 37 |
| Synthesis of (co)polymer (B) | | | | | | | | | | | |
| Solvent | | | | | | | | | | | |
| Xylene | 80 | 80 | 80 | 80 | 80 |  | 80 | 80 | 80 | 80 | 80 |
| Methyl cyclohexane |  |  |  |  |  | 80 |  |  |  |  |  |
| Copolymerizable monomer (C) | | | | | | | | | | | |
| Styrene | 10 | 10 | 10 | 10 |  | 10 | 61.6 | 10 | 10 | 10 |  |
| Methyl methacrylate | 61.6 | 61.6 | 61.6 | 54.6 | 40.6 | 63.6 | 10 | 61.6 | 54.6 | 54.6 |  |
| Ethyl acrylate | 16 | 16 | 16 | 16 |  | 16 | 16 | 16 | 16 | 16 |  |
| Butyl acrylate |  |  |  |  |  |  |  |  |  |  | 20 |
| Butyl methacrylate |  |  |  |  |  |  |  |  |  |  | 55 |
| Isobutyl methacrylate |  |  |  |  | 40 |  |  |  |  |  |  |
| Hydroxyethyl methacrylate | 7 | 7 | 7 | 14 | 14 | 5 | 7 | 7 | 14 | 14 | 5 |
| FM-3 | 5 | 5 | 5 | 5 | 5 | 5 | 5 | 5 | 5 | 5 | 5 |
| Acrylic acid |  |  |  | 0.4 |  |  |  |  |  |  |  |
| Methacrylic acid | 0.4 | 0.4 | 0.4 |  | 0.4 | 0.4 | 0.4 | 0.4 | 0.4 | 0.4 | 1 |
| Polymerization initiator (PBO) | 1.5 | 1.5 | 1.5 | 1.5 | 1.5 | 1.5 | 1.5 | 1.5 | 1.5 | 1.5 | 1.5 |
| Diluting solvent | | | | | | | | | | | |
| Xylene | 20 | 20 | 20 | 20 | 20 |  | 20 | 20 | 20 | 20 | 20 |
| Methylcyclohexane |  |  |  |  |  | 20 |  |  |  |  |  |
| Carboxylic anhydride addition | | | | | | | | | | | |
| Maleic anhydride | 2 | 2 | 2 | 2 | 2 | 2 | 2 |  | 6 |  | 2 |
| Dodecenyl succinic anhydride |  |  |  |  |  |  |  | 6 |  | 15 |  |
| Reaction | | | | | | | | | | | |
| Styrene TPE (A2-1) | 100 | 43 | 233 | 100 | 100 | 100 | 100 | 100 | 100 | 100 | 100 |
| Fats and Oils | | | | | | | | | | | |
| OLESTER C1000 |  |  |  |  |  |  |  |  |  |  | 20 |
| Solvent | | | | | | | | | | | |
| Xylene | 100 | 43 | 233 | 100 | 100 |  | 100 | 100 | 100 | 100 | 100 |
| Methylcyclohexane |  |  |  |  |  | 100 |  |  |  |  |  |
| Organic peroxide | | | | | | | | | | | |
| PBO |  |  |  |  |  | 21 |  |  |  |  |  |
| PBD | 14 | 10 | 23.3 | 14 | 14 |  | 14 | 14 | 14 | 14 | 14 |

TABLE B1-3-continued

| | Preparation Example B | | | | | | | | | | | |
|---|---|---|---|---|---|---|---|---|---|---|---|---|
| | 26, 27 | 28 | 29 | 30 | 31 | 32 | 33 | 34 | 35 | 36 | 37 |
| Diluting solvent | | | | | | | | | | | |
| Xylene | 271 | 195 | 449 | 271 | 271 | | 271 | 281 | 281 | 302 | 318 |
| Methylcyclohexane | | | | | | 271 | | | | | |

1) FM-3: Lactone modified hydroxyethyl nethacrylate (manufactured by Daicel Chemical Industries, Ltd.)
2) TPE of Styrene TPE(A2-1): Thermoplastic elastomer
3) Unit: part by weight

TABLE B1-4

| | Preparation Example B | | | | | | | | | | | | |
|---|---|---|---|---|---|---|---|---|---|---|---|---|---|
| | 38 | 39 | 40 | 41 | 42 | 43 | 44 | 45 | 46 | 47 | 48 | 49 | 50 |
| Synthesis of (co)polymer (B) | | | | | | | | | | | | | |
| Solvent | | | | | | | | | | | | | |
| Xylene | 80 | 80 | 80 | 80 | 80 | 80 | 80 | 80 | 80 | 80 | 80 | 80 | 80 |
| Copolymerizable monomer (C) | | | | | | | | | | | | | |
| Styrene | 15 | 15 | 15 | 15 | 15 | 15 | 15 | 15 | 15 | 15 | 15 | 15 | 15 |
| Butyl acrylate | 20 | 20 | 20 | 20 | 20 | 20 | 20 | 20 | 20 | 20 | 20 | 20 | 20 |
| Butyl methacrylate | 54 | 54 | 54 | 54 | 54 | 54 | 54 | 54 | 54 | 54 | 54 | 54 | 54 |
| Hydroxyethyl methacrylate | 5 | 5 | 5 | 5 | 5 | 5 | 5 | 5 | 5 | 5 | 5 | 5 | 5 |
| FM-3 | 5 | 5 | 5 | 5 | 5 | 5 | 5 | 5 | 5 | 5 | 5 | 5 | 5 |
| Methacrylic acid | 1 | 1 | 1 | 1 | 1 | 1 | 1 | 1 | 1 | 1 | 1 | 1 | 1 |
| Polymerization initiator (PBO) | 1.5 | 1.5 | 1.5 | 1.5 | 1.5 | 1.5 | 1.5 | 1.5 | 1.5 | 1.5 | 1.5 | 1.5 | 1.5 |
| Diluting solvent | | | | | | | | | | | | | |
| Xylene | 20 | 20 | 20 | 20 | 20 | 20 | 20 | 20 | 20 | 20 | 20 | 20 | 20 |
| Carboxylic anhydride addition | | | | | | | | | | | | | |
| Maleic anhydride | 2 | 2 | 2 | 2 | 2 | 2 | 2 | 2 | 2 | 2 | 2 | 2 | 2 |
| Reaction | | | | | | | | | | | | | |
| Styrene TPE (A2-1) | 100 | 100 | 100 | 100 | 100 | 100 | 100 | 100 | 100 | 100 | 100 | 100 | 100 |
| Fats and Oils | | | | | | | | | | | | | |
| OLESTER C1000 | | | | | 20 | 20 | | | | 15 | 15 | 15 | |
| OLESTER F77-60MS | 33.3 | | | | | | | | | | | | |
| OLESTER C1000 modified resin | | | | | | | 20 | | | 5 | | | |
| Epoxy resin | | | | | | | | | | | | | |
| EPOMIK R140 | | 20 | | | 10 | | | | | | | | |
| DENACOL EX941 | | | 20 | | | | | | | | | | |
| EPOMIK R140 modified resin | | | | | | | | 20 | | | 5 | | |
| Polyester resin | | | | | | | | | | | | | |
| ALMATEX P646 | | | | 33.3 | | | | | | | | | |
| OLESTER Q173 | | | | | 20 | | 10 | | | | | | |
| ALMATEX P646 modified resin | | | | | | | | | 33.3 | | | | 8.3 |
| Solvent | | | | | | | | | | | | | |
| Xylene | 86.7 | 100 | 100 | 86.7 | 100 | 100 | 100 | 100 | 100 | 86.7 | 100 | 100 | 96.7 |
| Organic peroxide | | | | | | | | | | | | | |
| PBO | 14 | 14 | 14 | 14 | 14 | 14 | 14 | 14 | 14 | 14 | 14 | 14 | 14 |
| Diluting solvent | | | | | | | | | | | | | |
| Xylene | 318 | 318 | 318 | 318 | 318 | 341 | 341 | 318 | 318 | 318 | 318 | 318 | 318 |

1) FM-3: Lactone modified hydroxyethyl methacrylate (manufactured by Daicel Chemical Industries, Ltd.)
2) TPE of Styrene TPE(A2-1): Thermoplastic elastomer
3) Unit: part by weight

TABLE B1-5

| | Preparation Example B | | | | | | | | | | | | |
|---|---|---|---|---|---|---|---|---|---|---|---|---|
| | 51,52 | 53,54 | 55,56 | 57 | 58 | 59 | 60 | 61 | 62 | 63 | 64 | 65 |
| Solvent | | | | | | | | | | | | |
| SHELLSOL 70 | 150 | | | 150 | 150 | 150 | 150 | 150 | 150 | 150 | 165 | 158.3 |
| Methylcyclohexane | | 150 | | | | | | | | | | |
| Toluene | | | 150 | | | | | | | | | |
| Styrene TPE (A2-1) | 50 | 50 | 50 | 30 | 70 | 50 | 50 | 50 | 50 | 50 | 50 | 50 |
| Copolymerizable monomer (C) | | | | | | | | | | | | |
| Styrene | 10 | 10 | 10 | 14 | 6 | 10 | 10 | 24 | | 10 | 8 | 8 |
| Methyl methacrylate | 24 | 24 | 24 | 33.6 | 14.4 | 24 | 24 | 10 | 5 | | | |
| Ethyl acrylate | 10 | 10 | 10 | 14 | 6 | 10 | 10 | 10 | | | | |
| Butyl acrylate | | | | | | | | | | 10 | 10 | 10 |
| Butyl methacrylate | | | | | | | | | | 24 | 29 | 29 |
| Isobutyl methacrylate | | | | | | | | | | 15 | | |
| 2-Ethylhexyl acrylate | | | | | | | | | | 19 | | |
| Hydroxyethyl methacrylate | 5 | 5 | 5 | 7 | 3 | 5 | 5 | 5 | | | | |
| FM-3 | | | | | | | | | | 10 | 5 | 2.5 | 2.5 |
| Methacrylic acid | 1 | 1 | 1 | 1.4 | 0.6 | 1 | 1 | 1 | 1 | 1 | 0.5 | 0.5 |
| Reaction | | | | | | | | | | | | |
| Fats and Oils | | | | | | | | | | | | |
| OLESTER C1000 | | | | | | | | | | | 10 | |
| OLESTER F77-60MS | | | | | | | | | | | | 16.7 |
| Polymerization initiator | | | | | | | | | | | | |
| PBD | 0.5 | | | 0.7 | 0.3 | 0.5 | | 1 | 1 | 1 | 1.1 | 1.1 |
| PBO | | 0.7 | 0.7 | | | | | | | | | |
| AIBN | | | | | | | 0.56 | | | | | |
| Organic peroxide | | | | | | | | | | | | |
| PBD | 2 | | | 2.8 | 1.2 | 7 | 2 | 2 | 2 | 2 | 2 | 2 |
| PBO | | 3 | 3 | | | | | | | | | |

1) SHELLSOL 70 (Trade Name): Isoparaffin solvent (manufactured by Shell Japan Ltd.)
2) FM-3: Lactone modified hydroxyethyl methacrylate (manufactured by Daicel Chemical Industries, Ltd.)
3) TPE of Styrene TPE(A2-1): Thermoplastic elastomer
4) Unit: part by weight

TABLE B1-6

| | Preparation Example B | | | | | | | | | | | |
|---|---|---|---|---|---|---|---|---|---|---|---|---|
| | 66 | 67 | 68 | 69 | 70 | 71 | 72 | 73 | 74 | 75 | 76 | 77 |
| Solvent | | | | | | | | | | | | |
| SHELLSOL 70 | 165 | 165 | 158.3 | 165 | 172.5 | 172.5 | 165 | 165 | 158.3 | 172.5 | 172.5 | 169.2 |
| STYRENE TPE (A2-1) | 50 | 50 | 50 | 50 | 50 | 50 | 50 | 50 | 50 | 50 | 50 | 50 |
| Copolymerizable monomer (C) | | | | | | | | | | | | |
| Styrene | 8 | 8 | 8 | 8 | 8 | 8 | 8 | 8 | 8 | 8 | 8 | 8 |
| Butyl acrylate | 10 | 10 | 10 | 10 | 10 | 10 | 10 | 10 | 10 | 10 | 10 | 10 |
| Butyl methacrylate | 29 | 29 | 29 | 29 | 29 | 29 | 29 | 29 | 29 | 29 | 29 | 29 |
| FM-3 | 2.5 | 2.5 | 2.5 | 2.5 | 2.5 | 2.5 | 2.5 | 2.5 | 2.5 | 2.5 | 2.5 | 2.5 |
| Methacrylic acid | 0.5 | 0.5 | 0.5 | 0.5 | 0.5 | 0.5 | 0.5 | 0.5 | 0.5 | 0.5 | 0.5 | 0.5 |
| Reaction | | | | | | | | | | | | |
| Fats and Oils | | | | | | | | | | | | |
| OLESTER C1000 | | | | 10 | 10 | | | | | 10 | 10 | 10 |
| OLESTER C1000 modified resin | | | | | | 10 | | | | 5 | | |
| Epoxy resin | | | | | | | | | | | | |
| EPOMIK R140 | 10 | | | 5 | | | | | | | | |
| DENACOL EX941 | | 10 | | | | | | | | | | |
| EPOMIK R140 modified resin | | | | | | | | | 10 | | 5 | |

TABLE B1-6-continued

| | Preparation Example B | | | | | | | | | | | |
|---|---|---|---|---|---|---|---|---|---|---|---|---|
| | 66 | 67 | 68 | 69 | 70 | 71 | 72 | 73 | 74 | 75 | 76 | 77 |
| Polyester resin | | | | | | | | | | | | |
| ALMATEX P646 | | | 16.7 | | | | | | | | | |
| OLESTER Q173 | | | | 10 | | 5 | | | | | | |
| ALMATEX P646 modified resin | | | | | | | | | 16.7 | | | 8.3 |
| Polymerization initiator | | | | | | | | | | | | |
| PBD | 1.1 | 1.1 | 1.1 | 1.1 | 1.1 | 1.1 | 1.1 | 1.1 | 1.1 | 1.1 | 1.1 | 1.1 |
| Organic peroxide | | | | | | | | | | | | |
| PBD | 2 | 2 | 2 | 2 | 2 | 2 | 2 | 2 | 2 | 2 | 2 | 2 |

1) SHELLSOL 70 (Trade Name): Isoparaffin solvent (manufactured by Shell Japan Ltd.)
2) FM-3: Lactone modified hydroxyethyl methacrylate (manufactured by Daicel Chemical Industries, Ltd.)
3) TPE of Styrene TPE(A2-1): Thermoplastic elastomer
4) Unit: part by weight Preparation Examples B78 to B81

In each example, 100 parts of the resin composition prepared in Preparation Examples B1, B26, B51 or B58 was distilled under reduced pressure at 100° C. to remove 54 parts of the solvent. To the resin composition, 54 parts of propylene glycol monomethylether acetate was added and thereby a resin solution (a) containing a modified styrene thermoplastic elastomer (A2-2) or (A2-3) was obtained.

Preparation Examples B82 to B89
[Preparation of Resin Solution (a) Containing Curing Agent]

Each of the resin solutions prepared in Preparation Examples, B1, B26, B51, B58 and B78 to B81, was mixed with OLESTER NM89-50G (Trade name; Mitsui Chemicals, Inc. non-volatile components 50%, NCO content 6%) which was a curing agent containing an isocyanate group (referred to as NCO) in such amounts that the molar ratio of OH to NCO of 1/1, to obtain a resin solution (a) containing the curing agent.

The kind of the styrene thermoplastic elastomer (A-1) used in the above was as follows. In Preparation Examples B1, B3 to B25, B26, B28 to B50, B51, B53, B55 and B57 to B77, SEPTON 2002 (Trade name; manufactured by KURARAY CO., Ltd. Styrene content: 30% by weight, MFR(ASTM D 1238, 230° C., under a load of 2.16 Kg): 70 g/10 min) was used. In preparation Examples B2, B27, B52, B54 and B56, SEPTON 8007 (Trade name; manufactured by KURARAY CO., Ltd. Styrene content: 29% by weight, MFR(ASTM D 1238, 230° C., under a load of 2.16 Kg): 1 g/10 min) was used, respectively.

Further, with regard to the third component used above, OLESTER C1000 (Trade name; manufactured by Mitsui Chemicals Inc. oily polyol, non-volatile components: 100%, valence of hydroxyl group 160 mgKOH/g) and OLESTER F77-60MS (Trade name; manufactured by Mitsui Chemicals Inc. oil modified polyurethane resin, non-volatile components: 60%) were fats and oils or derivatives thereof. EPOMIK R140 (Trade name; manufactured by Mitsui Chemicals Inc., non-volatile components: 100%, EPOXY equivalent: 190 g/eq) and DENACOL EX941 (Trade name; manufactured by Nagase Chemtex, non-volatile components: 100%, epoxy equivalent: 172 g/eq) were epoxy resins. ALMATEX P646 (Trade name; manufactured by Mitsui Chemicals Inc. non-volatile components: 60%, valence of hydroxyl group: 35 mgKOH/g) and OLESTER Q173 (Trade name; manufactured by Mitsui Chemicals Inc., non-volatile components: 100%, valence of hydroxyl group: 245 mgKOH/g) were polyester resins.

Further, SHELLSOL 70 (Trade name) used above was an isoparaffin organic solvent manufactured by Shell Japan Ltd.

Furthermore, the OLESTER C1000 modified resin having a polymerizable unsaturated bond in the molecule was prepared by adding 1.4 parts of maleic anhydride to 100 parts of OLESTER C1000 and stirring at 100° C. for 3 hr, thereby performing addition of maleic anhydride.

The EPOMIK R140 modified resin having a polymerizable unsaturated bond in the molecule was prepared by adding 1.2 parts of maleic anhydride to 100 parts of EPOMIK R140 and stirring at 100° C. for 3 hr, thereby performing addition of maleic anhydride.

The ALMATEX P646 modified resin having a polymerizable unsaturated bond in the molecule was prepared by adding 0.04 part of maleic anhydride to 100 parts of ALMATEX P646 and stirring at 100° C. for 3 hr, thereby performing addition of maleic anhydride.

Examples B1 to B89

In each example, to the resin solution (a) prepared in the above preparation example, IRGACURE 500 which was a photo-polymerization initiator (d) (Trade name; manufactured by Ciba Speciality Chemicals, eutectic mixture of 1-hydroxy-cyclohexyl-phenyl-ketone and benzophenone) was added in an amount of 2% based on the resin component to obtain a resin composition.

Examples B90 to B97

In each example, to the resin solution prepared in Preparation Example B1, B26, B51, B58 or B78 to B81, IRGACURE 184, which was a photo-polymerization initiator (d) (Trade name; manufactured by Ciba Speciality Chemicals, 1-hydroxy-cyclohexyl-phenyl-ketone), was added in an amount of 2 parts based on 100 parts of the resin component to obtain a resin composition.

Examples B98 to B105

In each example, to the resin solution (a) prepared in Preparation Example B1, B26, B51, B58 or B78 to B81, IRGACURE 500, which was a photo-polymerization initiator (d), was added in an amount of 4 parts based on 100 parts of the resin component to obtain a resin composition.

Example B106

To the resin solution (a) prepared by the process of Example 1 described in JP-A-Hei4-264174/1992, IRGA- CURE 500, which was a photo-polymerization initiator (d), was added in an amount of 2 parts based on 100 parts of the resin component to obtain a resin composition.

Comparative Examples B1 to B8

In each example, the resin solution (a) prepared in Preparation Example B1, B26, B51, B58 or B78 to B81 was used as a specimen without addition of a photo-polymerization initiator.

Comparative Example B9

The resin solution prepared by the process of Example 1 described in JP-A-Hei4-264174/1992 was used as a specimen.

In Examples B1 to B106 and Comparative Examples B1 to B9, the following properties were determined and evaluated.

(1) Viscosity of Resin composition solution

The obtained resin composition was regulated with the same solvent as used in the preparation of the resin solution (a) so that the content of non-volatile components was 10%, and the time of drop(sec) was measured at 25° C. using Ford cup No. 4 in accordance with JIS K 5400. The results of Examples are shown in Table B2 and the results of Comparative Examples are shown in Table B3. With regard to Example B106 and Comparative Example B9, resin compositions having a content of non-volatile components of 5% regulated by toluene were used for measurement.

(2) Stability of Resin Composition Solution

The obtained resin composition in a solution state was allowed to stand in a dark room in a non-volatile content of 30% at 40° C. for 1 week, and then the condition thereof was evaluated. After elapse of 1 week, the resin composition, which was observed to be free from separation and precipitation, was evaluated as ○, the resin composition, which was observed to have separation and precipitation but was easily dispersed by stirring, was evaluated as Δ and the resin composition, which was observed to have separation and precipitation and was not easily dispersed by stirring, was evaluated as x. The results of Examples are shown in Table B2 and the results of Comparative Examples are shown Table B3. With regard to Examples B82 to B89, the test of stability was not conducted. With regard to Example B106 and Comparative Example B9, resin compositions having a content of non-volatile components of 5% regulated by toluene were used for evaluation.

(3) Sprayability of Resin Composition

Using a coating gun (Winder spray gun (Trade name: W-88-13H5G manufactured by Iwata Tosoki Kogyo Co.), each of the resin composition prepared in each of Examples and Comparative Examples was sprayed at a spray pressure of 4 Kg/cm², with a nozzle opening per rotation in a coating booth at an inside temperature of 30° C., and whether there exists generation of stringiness or not was observed. When no stringiness was observed, the resin composition was evaluated as ○. When at least one string was observed, it was evaluated as x. The results of Examples are shown in Table B2 and the results of Comparative Examples are shown in Table B3.

(4) Evaluation of Adhesion in Sheet

Each of the resin compositions prepared in the above was regulated to have a content of non-volatile components of 20% by adding the same solvent as used in the preparation of the resin solution (a). In Example B106 and Comparative Example B9, the non-volatile component content was regulated to be 5% by toluene. Subsequently, a sheet made by a polyolefin resin available as TAFMER A 4085 (Trade Name: Mitsui Chemicals Inc. MFR (ASTM D 1238, 190° C., under a load of 2.16 Kg) of 3.6 g/10 min, density (ASTM D 1505) of 0.88 g/cm³) was cleaned with isopropyl alcohol. Thereon, the resin composition was applied with a blush in such an amount that the film thickness after drying was 2 μm, and dried at room temperature. Then, using an UV irradiator equipped with one 80 W/cm high-pressure mercury vapor lamp (Model EPSH-600-3S manufactured by JAPAN STORAGE BATTERY CO., LTD.) set vertically to the passing direction, the coated sheet put at a position of 15 cm under a light source was moved at a conveyer speed of 10 m/min, to perform UV light irradiation.

(5) Cross-cut Peel Test

In accordance with the cross-cut peel test described in JIS-K-5400, a specimen having intersecting horizontal and vertical score marks was prepared from the resulting coating film. An adhesive cellophane tape (cello tape: product of NICHIBAN CO.) was adhered to the score mark surface of the specimen and thereafter, the tape was pulled rapidly at 90° and thereby it was peeled off. The specimen was evaluated by the number of non-peeled squares among 100 squares. The results of Examples are shown in Table B2 and the results of Comparative Examples are shown in Table B3.

(6) Follow-up Properties Test

The sheet was folded at 90° and then returned to an initial condition. With regard to the folding part of the sheet, observation of coating appearance and cross-cut peel test were conducted. The sheet having good appearance and no peeling of the folding part was evaluated as ○, the sheet having lifting in the folding part was evaluated as Δ, and the sheet having peel at the folding was evaluated as x. The results of Examples are shown in Table B2 and the results of Comparative Examples are shown in Tables B3.

(7) Measurement of Peel Strength

On the obtained coating film, a white topcoat paint was applied in such an amount that the thickness after drying was 20 μm, to form a coating film and then allowed to stand at room temperature for 10 min. Thereafter, the coating film-having sheet was put into an oven at 100° C. and subjected to thermosetting treatment for 30 min. The peel strength of the coating film was measured.

In the measurement of the peel strength, rifts having a width of 1 cm were formed on the coating film. The end of the coating film was peeled and then pulled at 180° at a rate of 50 mm/min, and thereby the peel strength was measured. The coating film having peel strength of 800 g/cm or more was evaluated as ○, the coating film having peel strength of 400 g/cm or more and less than 800 g/cm was evaluated as Δ, and the coating film having less than 400 g/cm was evaluated as x. The results of Examples are shown in Table B2 and the results of Comparative Examples are shown in Table B3.

The topcoat paint used above was comprised of a main component obtained by dispersing 30 g of Tipeqe-CR93 (Trade Name: manufactured by ISHIHARA SANGYO KAISHA, LTD) in 100 g of OLESTER Q186 (Trade Name: manufactured by Mitsui Chemicals Inc., non-volatile components 50%, valence of hydroxyl group 30 mgKOH/g), and OLESTER NM89-50G (Trade Name: manufactured by Mitsui Chemicals Inc., non-volatile components 50%, NCO content 6%) which is a curing agent having an isocyanate group in a molar ratio OH/NCO of 0.95.

(8) Evaluation of Adhesion in Foamed Article

Each of the obtained resin compositions was regulated to have a non-volatile content of 10% by adding the same solvent used in the preparation of the resin solution (a).

In Example B106 and Comparative Example B9, the non-volatile content was regulated to 5% by toluene. Subsequently, a foamed article prepared by the method as described in Example 1 of JP-A-2000-344924 was immersed in a mixed solvent (methylcyclohexane/isopropyl alcohol/methyl ethyl ketone =65 parts/20 parts/15 parts) for 1 min and the above resin composition was applied thereon with a brush in such an amount that the film thickness after drying was 1 μm, followed by drying. Then, using an UV irradiator equipped with one 80 W/cm high-pressure mercury vapor lamp (Model EPSH-600-3S manufactured by JAPAN STORAGE BATTERY CO., LTD.) set vertically to the passing direction, the foamed article put at a position of 15 cm under a light source was moved at a conveyer speed of 10 m/min, to perform UV light irradiation.

The peel strength test of the coating films prepared after the UV light irradiation was conducted with the following two methods.

<Evaluation 1>

A foamed article was prepared by coating an aqueous urethane resin (BOND ACE W-01 manufactured by Tosei Chemical Co., Ltd.) in such an amount that the film thickness after drying was 5 μm on the coating film of the foamed article prepared after the UV light irradiation in the above and then drying. A sheet was prepared by coating a primer (D-PLY 007 manufactured by Tosei Chemical Co., Ltd.) in such an amount that the film thickness after drying was 1 μm with a brush on a synthesized rubber sheet cleaned with acetone (Trade Name: NIPOL BR1220 available from JSR Co., Ltd.), further coating an aqueous urethane resin (BOND ACE W-01 manufactured by Tosei Chemical Co., Ltd.) in such an amount that the film thickness after drying was 5 μm with a brush and then drying. They were bonded at 60° C. at a pressure 40 Kg/m$^2$ for 10 sec and then allowed to stand for 48 hr.

Subsequently, rifts having a width of 1 cm were formed on the coating film of the rubber sheet prepared above. The end of the coating film of the rubber sheet was peeled and then pulled at 180° at a rate of 200 mm/min, and thereby the peel strength was measured. The coating film having peel strength of 3 Kg/cm or more was evaluated as ○, the coating film having peel strength of 1.5 Kg/cm or more and less than 3 Kg/cm was evaluated as Δ, and the coating film having less than 1.5 Kg/cm was evaluated as x. The results of Examples are shown in Table B2 and the results of Comparative Examples are shown in Table B3.

<Evaluation 2>

A foamed article was prepared by coating an aqueous urethane resin (BOND ACE W-01 manufactured by Tosei Chemical Co., Ltd.) in such an amount that the film thickness after drying was 5 μm with a brush on the coating film of the foamed article prepared after the UV light irradiation in the above, and then drying. A sheet was prepared by coating a primer (BOND ACE 232H manufactured by Tosei Chemical Co., Ltd.) in such an amount that the film thickness after drying was 1 μm with a brush on a urethane sheet (DRY method made polyurethane sheet for shoes available from Dae Jin Synthesis Chemical), further coating an aqueous urethane resin (BOND ACE W-01 manufactured by Tosei Chemical Co., Ltd.) in such an amount that the film thickness after drying was 5 μm with a brush and then drying. They were bonded at 60° C. at a pressure 40 Kg/m$^2$ for 10 sec and then allowed to stand 48 hr.

Subsequently, rifts having a width of 1 cm were formed on the coating film of the urethane sheet prepared above. The end of the coating film of the urethane sheet was peeled and then pulled at 180° at a rate of 200 mm/min, and thereby the peel strength was measured. The coating film having peel strength of 3 Kg/cm or more was evaluated as ○, the coating film having peel strength of 1.5 Kg/cm or more and less than 3 Kg/cm was evaluated as A, and the coating film having less than 1.5 Kg/cm was evaluated as x. The results of Examples are shown in Table B2 and the results of Comparative Examples are shown in Table B3.

TABLE B2

| | Example B | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| Solution Properties | | | | | | | | | | | | | | | | |
| Solution viscosity (sec) | 16 | 17 | 15 | 24 | 18 | 13 | 16 | 16 | 16 | 15 | 15 | 16 | 16 | 16 | 15 | 16 |
| Stability | ○ | ○ | ○ | ○ | ○ | ○ | ○ | ○ | ○ | ○ | ○ | ○ | ○ | ○ | ○ | ○ |
| Suitability for Spray | ○ | ○ | ○ | ○ | ○ | ○ | ○ | ○ | ○ | ○ | ○ | ○ | ○ | ○ | ○ | ○ |
| Evaluation in Sheets | | | | | | | | | | | | | | | | |
| Cross-cut peel test | 100 | 100 | 100 | 100 | 100 | 100 | 100 | 100 | 100 | 100 | 100 | 100 | 100 | 100 | 100 | 100 |
| Follow-up test | ○ | ○ | ○ | ○ | ○ | ○ | ○ | ○ | ○ | ○ | ○ | ○ | ○ | ○ | ○ | ○ |
| Peel strength test | ○ | ○ | ○ | ○ | ○ | ○ | ○ | ○ | ○ | ○ | ○ | ○ | ○ | ○ | ○ | ○ |
| Evaluation in Foamed articles | | | | | | | | | | | | | | | | |
| Evaluation 1 Rubber | ○ | ○ | ○ | ○ | ○ | ○ | ○ | ○ | ○ | ○ | ○ | ○ | ○ | ○ | ○ | ○ |
| Evaluation 2 Urethane sheet | ○ | ○ | ○ | ○ | ○ | ○ | ○ | ○ | ○ | ○ | ○ | ○ | ○ | ○ | ○ | ○ |

| | Example B | | | | | | | | | | | | | | | |
|---|---|---|---|---|---|---|---|---|---|---|---|---|---|---|---|---|
| | 17 | 18 | 19 | 20 | 21 | 22 | 23 | 24 | 25 | 26 | 27 | 28 | 29 | 30 | 31 | 32 |
| Solution Properties | | | | | | | | | | | | | | | | |
| Solution viscosity (sec) | 17 | 18 | 17 | 16 | 15 | 16 | 17 | 18 | 18 | 17 | 16 | 16 | 17 | 15 | 16 | 13 |

TABLE B2-continued

| | | | | | | | | | | | | | | | | |
|---|---|---|---|---|---|---|---|---|---|---|---|---|---|---|---|---|
| Stability | ○ | ○ | ○ | ○ | ○ | ○ | ○ | ○ | ○ | ○ | ○ | ○ | ○ | ○ | ○ | ○ |
| Suitability for Spray | ○ | ○ | ○ | ○ | ○ | ○ | ○ | ○ | ○ | ○ | ○ | ○ | ○ | ○ | ○ | ○ |
| Evaluation in Sheets | | | | | | | | | | | | | | | | |
| Cross-cut peel test | 100 | 100 | 100 | 100 | 100 | 100 | 100 | 100 | 100 | 100 | 100 | 100 | 100 | 100 | 100 | 100 |
| Follow-up test | ○ | ○ | ○ | ○ | ○ | ○ | ○ | ○ | ○ | ○ | ○ | ○ | ○ | ○ | ○ | ○ |
| Peel strength test | ○ | ○ | ○ | ○ | ○ | ○ | ○ | ○ | ○ | ○ | ○ | ○ | ○ | ○ | ○ | ○ |
| Evaluation in Foamed articles | | | | | | | | | | | | | | | | |
| Evaluation 1 Rubber | ○ | ○ | ○ | ○ | ○ | ○ | ○ | ○ | ○ | ○ | ○ | ○ | ○ | ○ | ○ | ○ |
| Evaluation 2 Urethane sheet | ○ | ○ | ○ | ○ | ○ | ○ | ○ | ○ | ○ | ○ | ○ | ○ | ○ | ○ | ○ | ○ |

| | Example B | | | | | | | | | | | | | | | |
|---|---|---|---|---|---|---|---|---|---|---|---|---|---|---|---|---|
| | 33 | 34 | 35 | 36 | 37 | 38 | 39 | 40 | 41 | 42 | 43 | 44 | 45 | 46 | 47 | 48 |
| Solution Properties | | | | | | | | | | | | | | | | |
| Solution viscosity (sec) | 17 | 15 | 16 | 17 | 16 | 18 | 17 | 16 | 15 | 16 | 17 | 16 | 16 | 17 | 18 | 16 |
| Stability | ○ | ○ | ○ | ○ | ○ | ○ | ○ | ○ | ○ | ○ | ○ | ○ | ○ | ○ | ○ | ○ |
| Suitability for Spray | ○ | ○ | ○ | ○ | ○ | ○ | ○ | ○ | ○ | ○ | ○ | ○ | ○ | ○ | ○ | ○ |
| Evaluation in Sheets | | | | | | | | | | | | | | | | |
| Cross-cut peel test | 100 | 100 | 100 | 100 | 100 | 100 | 100 | 100 | 100 | 100 | 100 | 100 | 100 | 100 | 100 | 100 |
| Follow-up test | ○ | ○ | ○ | ○ | ○ | ○ | ○ | ○ | ○ | ○ | ○ | ○ | ○ | ○ | ○ | ○ |
| Peel strength test | ○ | ○ | ○ | ○ | ○ | ○ | ○ | ○ | ○ | ○ | ○ | ○ | ○ | ○ | ○ | ○ |
| Evaluation in Foamed articles | | | | | | | | | | | | | | | | |
| Evaluation 1 Rubber | ○ | ○ | ○ | ○ | ○ | ○ | ○ | ○ | ○ | ○ | ○ | ○ | ○ | ○ | ○ | ○ |
| Evaluation 2 Urethane sheet | ○ | ○ | ○ | ○ | ○ | ○ | ○ | ○ | ○ | ○ | ○ | ○ | ○ | ○ | ○ | ○ |

| | Example B | | | | | | | | | | | | | | | |
|---|---|---|---|---|---|---|---|---|---|---|---|---|---|---|---|---|
| | 49 | 50 | 51 | 52 | 53 | 54 | 55 | 56 | 57 | 58 | 59 | 60 | 61 | 62 | 63 | 64 |
| Solution Properties | | | | | | | | | | | | | | | | |
| Solution viscosity (sec) | 15 | 16 | 13 | 12 | 13 | 12 | 16 | 17 | 16 | 18 | 17 | 18 | 17 | 16 | 17 | 17 |
| Stability | ○ | ○ | ○ | ○ | ○ | ○ | ○ | ○ | ○ | ○ | ○ | ○ | ○ | ○ | ○ | ○ |
| Suitability for Spray | ○ | ○ | ○ | ○ | ○ | ○ | ○ | ○ | ○ | ○ | ○ | ○ | ○ | ○ | ○ | ○ |
| Evaluation in Sheets | | | | | | | | | | | | | | | | |
| Cross-cut peel test | 100 | 100 | 100 | 100 | 100 | 100 | 100 | 100 | 100 | 100 | 100 | 100 | 100 | 100 | 100 | 100 |
| Follow-up test | ○ | ○ | ○ | ○ | ○ | ○ | ○ | ○ | ○ | ○ | ○ | ○ | ○ | ○ | ○ | ○ |
| Peel strength test | ○ | ○ | ○ | ○ | ○ | ○ | ○ | ○ | ○ | ○ | ○ | ○ | ○ | ○ | ○ | ○ |
| Evaluation in Foamed articles | | | | | | | | | | | | | | | | |
| Evaluation 1 Rubber | ○ | ○ | ○ | ○ | ○ | ○ | ○ | ○ | ○ | ○ | ○ | ○ | ○ | ○ | ○ | ○ |
| Evaluation 2 Urethane sheet | ○ | ○ | ○ | ○ | ○ | ○ | ○ | ○ | ○ | ○ | ○ | ○ | ○ | ○ | ○ | ○ |

| | Example B | | | | | | | | | | | | | | | |
|---|---|---|---|---|---|---|---|---|---|---|---|---|---|---|---|---|
| | 65 | 66 | 67 | 68 | 69 | 70 | 71 | 72 | 73 | 74 | 75 | 76 | 77 | 78 | 79 | 80 |
| Solution Properties | | | | | | | | | | | | | | | | |
| Solution viscosity (sec) | 16 | 16 | 17 | 18 | 17 | 17 | 18 | 17 | 16 | 17 | 16 | 17 | 18 | 19 | 20 | 18 |
| Stability | ○ | ○ | ○ | ○ | ○ | ○ | ○ | ○ | ○ | ○ | ○ | ○ | ○ | ○ | ○ | ○ |
| Suitability for Spray | ○ | ○ | ○ | ○ | ○ | ○ | ○ | ○ | ○ | ○ | ○ | ○ | ○ | ○ | ○ | ○ |

TABLE B2-continued

| | Example B | | | | | | | | | | | | | | | |
|---|---|---|---|---|---|---|---|---|---|---|---|---|---|---|---|---|
| | | | | | | | | | | | | | | | | |
| Evaluation in Sheets | | | | | | | | | | | | | | | | |
| Cross-cut peel test | 100 | 100 | 100 | 100 | 100 | 100 | 100 | 100 | 100 | 100 | 100 | 100 | 100 | 100 | 100 | 100 |
| Follow-up test | ○ | ○ | ○ | ○ | ○ | ○ | ○ | ○ | ○ | ○ | ○ | ○ | ○ | ○ | ○ | ○ |
| Peel strength test | ○ | ○ | ○ | ○ | ○ | ○ | ○ | ○ | ○ | ○ | ○ | ○ | ○ | ○ | ○ | ○ |
| Evaluation in Foamed articles | | | | | | | | | | | | | | | | |
| Evaluation 1 Rubber | ○ | ○ | ○ | ○ | ○ | ○ | ○ | ○ | ○ | ○ | ○ | ○ | ○ | ○ | ○ | ○ |
| Evaluation 2 Urethane sheet | ○ | ○ | ○ | ○ | ○ | ○ | ○ | ○ | ○ | ○ | ○ | ○ | ○ | ○ | ○ | ○ |

| | Example B | | | | | | | | | | | | | | | |
|---|---|---|---|---|---|---|---|---|---|---|---|---|---|---|---|---|
| | 81 | 82 | 83 | 84 | 85 | 86 | 87 | 88 | 89 | 90 | 91 | 92 | 93 | 94 | 95 | 96 |
| Solution Properties | | | | | | | | | | | | | | | | |
| Solution viscosity (sec) | 21 | 18 | 19 | 14 | 20 | 21 | 21 | 19 | 22 | 16 | 17 | 13 | 18 | 19 | 20 | 18 |
| Stability | ○ | | | | | | | | | ○ | ○ | ○ | ○ | ○ | ○ | ○ |
| Suitability for Spray | ○ | ○ | ○ | ○ | ○ | ○ | ○ | ○ | ○ | ○ | ○ | ○ | ○ | ○ | ○ | ○ |
| Evaluation in Sheets | | | | | | | | | | | | | | | | |
| Cross-cut peel test | 100 | 100 | 100 | 100 | 100 | 100 | 100 | 100 | 100 | 100 | 100 | 100 | 100 | 100 | 100 | 100 |
| Follow-up test | ○ | ○ | ○ | ○ | ○ | ○ | ○ | ○ | ○ | ○ | ○ | ○ | ○ | ○ | ○ | ○ |
| Peel strength test | ○ | ○ | ○ | ○ | ○ | ○ | ○ | ○ | ○ | ○ | ○ | ○ | ○ | ○ | ○ | ○ |
| Evaluation in Foamed articles | | | | | | | | | | | | | | | | |
| Evaluation 1 Rubber | ○ | ○ | ○ | ○ | ○ | ○ | ○ | ○ | ○ | ○ | ○ | ○ | ○ | ○ | ○ | ○ |
| Evaluation 2 Urethane sheet | ○ | ○ | ○ | ○ | ○ | ○ | ○ | ○ | ○ | ○ | ○ | ○ | ○ | ○ | ○ | ○ |

| | Example B | | | | | | | | | |
|---|---|---|---|---|---|---|---|---|---|---|
| | 97 | 98 | 99 | 100 | 101 | 102 | 103 | 104 | 105 | 106 |
| Solution Properties | | | | | | | | | | |
| Solution viscosity (sec) | 21 | 16 | 17 | 13 | 18 | 19 | 20 | 18 | 21 | 11 |
| Stability | ○ | ○ | ○ | ○ | ○ | ○ | ○ | ○ | ○ | ○ |
| Suitability for Spray | ○ | ○ | ○ | ○ | ○ | ○ | ○ | ○ | ○ | ○ |
| Evaluation in Sheets | | | | | | | | | | |
| Cross-cut peel test | 100 | 100 | 100 | 100 | 100 | 100 | 100 | 100 | 100 | 100 |
| Follow-up test | ○ | ○ | ○ | ○ | ○ | ○ | ○ | ○ | ○ | ○ |
| Peel strength test | ○ | ○ | ○ | ○ | ○ | ○ | ○ | ○ | ○ | ○ |
| Evaluation in Foamed articles | | | | | | | | | | |
| Evaluation 1 Rubber | ○ | ○ | ○ | ○ | ○ | ○ | ○ | ○ | ○ | ○ |
| Evaluation 2 Urethane sheet | ○ | ○ | ○ | ○ | ○ | ○ | ○ | ○ | ○ | ○ |

TABLE B3

| | Comparative Example B | | | | | | | | |
|---|---|---|---|---|---|---|---|---|---|
| | 1 | 2 | 3 | 4 | 5 | 6 | 7 | 8 | 9 |
| Solution Properties | | | | | | | | | |
| Solution viscosity (sec) | 16 | 17 | 13 | 18 | 19 | 20 | 18 | 21 | 11 |
| Stability | ○ | ○ | ○ | ○ | ○ | ○ | ○ | ○ | ○ |
| Suitability for Spray | ○ | ○ | ○ | ○ | ○ | ○ | ○ | ○ | ○ |

TABLE B3-continued

| | Comparative Example B | | | | | | | | |
|---|---|---|---|---|---|---|---|---|---|
| | 1 | 2 | 3 | 4 | 5 | 6 | 7 | 8 | 9 |
| Evaluation in Sheets | | | | | | | | | |
| Cross-cut peel test | 100 | 100 | 100 | 100 | 100 | 100 | 100 | 100 | 100 |
| Follow-up test | ○ | ○ | ○ | ○ | ○ | ○ | ○ | ○ | ○ |
| Peel strength test | x | x | x | x | x | x | x | x | Δ |
| Evaluation in Foamed articles | | | | | | | | | |
| Evaluation 1 Rubber | Δ | Δ | Δ | Δ | Δ | Δ | Δ | Δ | Δ |
| Evaluation 2 Urethane sheet | x | x | x | x | x | x | x | x | Δ |

INDUSTRIAL APPLICABILITY

According to the present invention, the resin compositions having a conventionally unobtainable effect, that is, having excellent adhesion to polyolefin resin molded articles can be obtained.

Further, the paints which comprise the resin compositions or the main component containing the resin compositions according to the present invention and the curing agents capable of reacting with active hydrogen and/or hydroxyl group in the molecule are suitable for uses as primers, and paints and adhesives for polyolefin resin molded articles.

What is claimed is:

1. A resin composition comprising a photopolymerization initiator (d) and a resin solution (a) containing a modified product of a thermoplastic resin (A), wherein said modified product is prepared by conducting polymerization of a copolymerizable monomer (C) comprising a monomer having an α,β-mono-ethylenically unsaturated group, or the monomer and other copolymerizable monomers in a weight ratio (A)/(C) of 1/9 to 9/1, in an organic solvent in the presence of the thermoplastic resin (A), followed by conducting radical polymerization of said thermoplastic resin (A) and the copolymer obtained by polymerization of said copolymerizable monomer (C).

2. A resin composition according to claim 1, wherein the thermoplastic resin (A) is a polyolefin (A1).

3. A resin composition according to claim 1, wherein the thermoplastic resin (A) is a styrene thermoplastic elastomer (A2).

4. A resin composition according to claim 1, which further comprises at least one component selected from the group consisting of fats, oils, derivatives of fats or oils, an epoxy resin and a polyester resin.

5. A resin composition according to claim 4, wherein said at least one component has a polymerizable unsaturated bond in the molecule.

6. A resin composition according to claim 1, wherein the polymerization reaction is carried out in the presence of an organic peroxide.

7. A resin composition according to claim 6, wherein said organic peroxide has a tert-butyl group and/or a benzyl group.

8. A resin composition obtained by removing the organic solvent contained in the resin composition as claimed in claim 1 and then diluting with an organic solvent.

* * * * *

UNITED STATES PATENT AND TRADEMARK OFFICE
CERTIFICATE OF CORRECTION

PATENT NO. : 6,927,242 B2
DATED : August 9, 2005
INVENTOR(S) : Keiichi Asami et al.

It is certified that error appears in the above-identified patent and that said Letters Patent is hereby corrected as shown below:

Title page,
Item [56], References Cited, FOREIGN PATENT DOCUMENTS, insert:
-- JP    49-098454 A        9/1974 --.
Item [57], ABSTRACT,
Line 7, change "α,ß-mono-ethynically" to -- α,ß-mono-ethylenically --.

Signed and Sealed this

Third Day of January, 2006

JON W. DUDAS
*Director of the United States Patent and Trademark Office*